US006813139B2

(12) United States Patent
Bendale et al.

(10) Patent No.: US 6,813,139 B2
(45) Date of Patent: Nov. 2, 2004

(54) ELECTROCHEMICAL DOUBLE LAYER CAPACITOR HAVING CARBON POWDER ELECTRODES

(75) Inventors: Priya Bendale, San Diego, CA (US); Manuel R. Malay, San Diego, CA (US); John M. Dispennette, San Diego, CA (US); Chenniah Nanjundiah, San Diego, CA (US); Frederic Spiess, Vista, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 10/159,265

(22) Filed: May 29, 2002

(65) Prior Publication Data

US 2003/0086239 A1 May 8, 2003

Related U.S. Application Data

(63) Continuation-in-part of application No. 10/005,885, filed on Nov. 2, 2001, now Pat. No. 6,643,119.

(51) Int. Cl.⁷ .............................. H01G 9/00; H01G 2/10
(52) U.S. Cl. ...................... 361/502; 361/517; 361/535
(58) Field of Search ............................... 361/502–503, 361/508–509, 511, 516–521, 530, 535–540

(56) References Cited

U.S. PATENT DOCUMENTS

| | | | |
|---|---|---|---|
| 2,234,608 A | 3/1941 | Robinson et al. |
| 2,800,616 A | 7/1957 | Becker |
| 3,536,963 A | 10/1970 | Boos et al. |
| 3,648,126 A | 3/1972 | Boos et al. |
| 4,594,758 A | 6/1986 | Watanabe et al. |
| 4,730,239 A | 3/1988 | Currie et al. |

(List continued on next page.)

FOREIGN PATENT DOCUMENTS

| | | |
|---|---|---|
| CA | 660854 | 4/1963 |
| CA | 849697 | 8/1970 |
| EP | 0112923 | 6/1983 |

(List continued on next page.)

OTHER PUBLICATIONS

Cheng, et al.; "Preparation of Carbon Fibre Reinforced Aluminum Via Ultrasonic Liquid Infiltration Technique", *Materials Science and Technology*, 9, pp. 609–614 (Jul. 1993).

Foster, et al.; "New Highly Conductive Inorganic Electrolytes", *J. Electrochem. Soc.*, pp. 2682–2686, (Nov. 1988).

Farahmandi, et al.; "Optimization of Carbon Fibers Used in Electrochemical Capacitors for Electric Vehicle Applications", *The 36th Power Sources Conference, Cherry Hill, New Jersey*, pp. 23–26 (Jun. 6–9, 1994).

(List continued on next page.)

*Primary Examiner*—William H. Mayo, III
*Assistant Examiner*—Eric Thomas
(74) *Attorney, Agent, or Firm*—Gregory J. Koerner; Simon & Koerner LLP

(57) ABSTRACT

A method of making a double layer capacitor, in accordance with one embodiment, includes coupling a top collector disk to a proximal end of a double layer capacitor electrode assembly; electrically coupling a bottom collector disk to a distal end; heating a can; inserting the double layer capacitor electrode assembly into the can; cooling the can, wherein a peripheral edge of the bottom collector disk is coupled to the can as the diameter of the can is decreased; forming a bead around an exterior of the can; heating a lid; placing a concave structure of the lid in juxtaposition with a convex structure on the top collector disk; cooling the lid, wherein the concave structure is coupled to the convex structure as the diameter of the can is decreased; creating a seal between the lid and the can; and placing an electrolyte solution into the electrode assembly.

32 Claims, 17 Drawing Sheets

U.S. PATENT DOCUMENTS

| | | |
|---|---|---|
| 4,992,910 A | 2/1991 | Evans .................. 361/502 |
| 5,012,385 A | 4/1991 | Kurabayashi et al. |
| 5,065,286 A | 11/1991 | Kurabayashi et al. |
| 5,103,379 A | 4/1992 | Kurabayashi et al. |
| 5,121,301 A | 6/1992 | Kurabayashi et al. |
| 5,142,451 A | 8/1992 | Kurabayashi et al. |
| 5,253,148 A | 10/1993 | Katsu |
| 5,351,164 A | 9/1994 | Grigortchak et al. |
| 5,381,303 A | 1/1995 | Yoshida et al. |
| 5,398,155 A | 3/1995 | Sato et al. |
| 5,442,197 A | 8/1995 | Andrieu et al. |
| 5,453,909 A | 9/1995 | Kobayashi |
| 5,471,365 A | 11/1995 | Nakamura et al. |
| 5,550,706 A | 8/1996 | Kurzweil et al. |
| 5,581,438 A | 12/1996 | Halliop |
| 5,585,999 A | 12/1996 | De Long et al. |
| 5,621,608 A | 4/1997 | Arai et al. |
| 5,659,457 A | 8/1997 | Lian et al. |
| 5,682,288 A | 10/1997 | Wani |
| 5,742,474 A | 4/1998 | Shimizu et al. |
| 5,748,438 A | 5/1998 | Davis et al. |
| 5,748,439 A | 5/1998 | MacFarlane et al. |
| 5,751,541 A | 5/1998 | Li et al. |
| 5,786,981 A | 7/1998 | Aoki et al. |
| 5,793,603 A | 8/1998 | Lyman |
| 5,796,574 A | 8/1998 | Saito et al. |
| 5,812,367 A | 9/1998 | Kudoh et al. |
| 5,837,630 A | 11/1998 | Owens et al. |
| 5,847,920 A | 12/1998 | Li et al. |
| 5,850,331 A | 12/1998 | Matsumoto et al. |
| 5,875,092 A | 2/1999 | Jow et al. |
| 5,907,472 A | 5/1999 | Farahmandi et al. |
| 5,909,356 A | 6/1999 | Hirabayashi et al. |
| 5,914,852 A | 6/1999 | Hatanaka et al. |
| 5,917,693 A | 6/1999 | Kono et al. |
| 5,920,455 A | 7/1999 | Shah et al. |
| 5,923,525 A | 7/1999 | Belyakov et al. |
| 5,926,361 A | 7/1999 | Alford |
| 5,930,108 A | 7/1999 | Kurzweil et al. |
| 5,949,638 A | 9/1999 | Greenwood et al. |
| 5,955,215 A | 9/1999 | Kurzweil et al. |
| 5,959,832 A | 9/1999 | Kobayashi et al. |
| 6,031,712 A | 2/2000 | Kurihara et al. |
| 6,094,788 A | 8/2000 | Farahmandi et al. |
| 6,222,720 B1 | 4/2001 | Aoki et al. |
| 6,233,135 B1 | 5/2001 | Farahmandi et al. |
| 6,282,081 B1 * | 8/2001 | Takabayashi et al. ....... 361/502 |
| 6,402,792 B1 | 6/2002 | Hiratsuka et al. |
| 6,456,484 B1 | 9/2002 | Matsuoka et al. .......... 361/511 |
| 2002/0110729 A1 * | 8/2002 | Hozumi et al. ............. 429/130 |

FOREIGN PATENT DOCUMENTS

| | | | |
|---|---|---|---|
| EP | 0134706 | 8/1984 | |
| EP | 0207167 | 12/1985 | |
| EP | 0443825 | 8/1991 | |
| EP | 0622815 | 11/1994 | |
| EP | 0680061 | 3/1995 | |
| EP | 1033729 * | 9/2000 | ............ H01G/9/12 |
| JP | 5599714 | 7/1980 | |
| JP | 594114 | 1/1984 | |
| JP | 59105312 | 6/1984 | |
| JP | 63268221 | 4/1988 | |
| JP | 63261817 | 10/1988 | |
| JP | 64001220 | 1/1989 | |
| JP | 64001222 | 1/1989 | |
| JP | 1246812 | 2/1989 | |
| JP | 6446913 | 2/1989 | |
| JP | 153524 | 3/1989 | |
| JP | 1222425 | 5/1989 | |
| JP | 1201908 | 8/1989 | |
| JP | 1304719 | 8/1989 | |
| JP | 1298712 | 12/1989 | |
| JP | 256913 | 2/1990 | |
| JP | 265114 | 3/1990 | |
| JP | 266917 | 3/1990 | |
| JP | 278213 | 3/1990 | |
| JP | 21104 | 5/1990 | |
| JP | 2177525 | 7/1990 | |
| JP | 2248025 | 10/1990 | |
| JP | 256805 | 12/1990 | |
| JP | 2297915 | 12/1990 | |
| JP | 34510 | 1/1991 | |
| JP | 3289116 | 1/1991 | |
| JP | 3038815 | 2/1991 | |
| JP | 3132009 | 6/1991 | |
| JP | 3141629 | 6/1991 | |
| JP | 3201516 | 6/1991 | |
| JP | 465814 | 3/1992 | |
| JP | 474405 | 3/1992 | |
| JP | 488619 | 3/1992 | |
| JP | 499305 | 3/1992 | |
| JP | 4206914 | 7/1992 | |
| JP | 4206916 | 7/1992 | |
| JP | 4336409 | 11/1992 | |
| JP | 513284 | 1/1993 | |
| JP | 555085 | 3/1993 | |
| JP | 5217803 | 8/1993 | |
| JP | 5258996 | 10/1993 | |
| JP | 5299295 | 11/1993 | |
| JP | 6275469 | 6/1994 | |
| JP | 9/298129 * | 11/1997 | ............ H01G/9/00 |
| JP | 10244380 | 9/1998 | |
| WO | 9309552 | 5/1993 | |
| WO | 0124206 | 5/2000 | .......... H01G/9/016 |

OTHER PUBLICATIONS

Farahmandi, et al,; "Bipolar Electrochemical Capacitors Based on Organic Electrolytes for Electric Vehicle Applications", *The Fourth International Seminar on Double Layer Capacitors and Similar Energy Storage Devices, Boca Raton, Florida*, (Dec. 12–14, 1994).

Farahamndi, et al.; "A Comparison of Electrochemical Capacitors Using Organic and Aqueous Electrolytic Solutions for Electric Vehicle Applications", *Third International Seminar on Double Layer Capacitors and Similar Energy Storge Devices, Deerfield Beach, Florida*, (Dec. 6–8, 1993).

Fujii; "KYNOL Novoloid Fibers", *Information Brochure*, (1990).

Technical Notes, "The Charcoal Cloth", (1987).

International Search Report for international application No. PCT/US02/27190.

International Preliminary Examination Report for international application No. PCT/US02/27190.

* cited by examiner

ELECTROCHEMICAL DOUBLE LAYER CAPACITOR HAVING CARBON POWDER ELECTRODES

The present patent document is a continuation-in-part of U.S. patent application Ser. No. 10/005,885, filed Nov. 2, 2001, U.S. Pat. No. 6,643,119, for ELECTROCHEMICAL DOUBLE LAYER CAPACITOR HAVING CARBON POWDER ELECTRODES, the entirety of which is hereby expressly incorporated herein by reference.

BACKGROUND OF THE INVENTION

The present invention relates generally to electrochemical double layer capacitors, and more particularly to a high performance electrochemical double layer capacitor made with low-resistance carbon powder electrodes and low resistance current collectors.

Double layer capacitors, also referred to as electrochemical double layer capacitors (EDLC), are energy storage devices that are able to store more energy per unit weight and unit volume than traditional capacitors. In addition, because of their relatively low internal resistance, double layer capacitors can typically be charged and can, in turn, deliver stored energy at a higher power rating than rechargeable batteries.

Double layer capacitors may consist of two carbon electrodes that are isolated from electrical contact by a porous separator. Both the porous separator and the electrodes are immersed in an electrolyte solution, allowing ionic current (ionic flow) to flow between the electrodes through the separator at the same time that the separator prevents an electrical or electronic (as opposed to an ionic) current from shorting the two carbon electrodes.

Coupled to the back of each of the two carbon electrodes is typically a current collecting plate. One purpose of the current collecting plates is to reduce ohmic losses, i.e., internal resistance, in the double layer capacitor.

Double layer capacitors store electrostatic energy in a polarized liquid layer that forms when an electrical potential exists between the two carbon electrodes immersed in an electrolyte (or electrolyte solution). When the electrical potential is applied across the electrodes, a double layer of positive and negative charges is formed at the electrode-electrolyte interface (hence, the name "double layer" capacitor) by the polarization of electrolyte ions due to charge separation under the applied electrical potential, and also due to dipole orientation and alignment of electrolyte molecules over an entire surface of the electrodes.

Fabrication of double layer capacitors with carbon electrodes is described in U.S. Pat. No. 2,800,616 (Becker), and U.S. Pat. No. 3,648,126 (Boos et al.).

A major problem in many carbon-electrode capacitors, including electrochemical double layer capacitors with carbon electrodes, is that the performance of the carbon-electrode capacitor is often limited because of high internal resistance related to the carbon electrodes. This high internal resistance may be due to several factors, including high contact resistance of carbon-carbon contacts within the carbon electrodes, and further including high contact resistance of the electrode-current collector contacts. This high internal resistance translates to large ohmic losses in the carbon-electrode capacitor during charging and discharging of the carbon-electrode capacitor. These high ohmic losses further adversely affect, i.e., increase, a characteristic RC (resistance times capacitance) time constant of the capacitor and thus interfere with the carbon-electrode capacitor's ability to be efficiently charged and/or discharged in a short period of time.

There is thus a need in the art for systems and methods that lower the internal resistance within a carbon-electrode capacitor, and hence lower the characteristic RC time constant, of the carbon-electrode capacitors, as well as other improvements.

U.S. Pat. No. 5,907,472 to Farahmandi et al., the complete disclosure of which is incorporated herein by reference, discloses a multi-electrode double layer capacitor having aluminum-impregnated carbon cloth electrodes. The use of the aluminum-impregnated carbon cloth electrodes described therein results in an electrochemical double layer capacitor having a very low internal resistance.

U.S. patent application Ser. No. 10/005,885 (Attorney Docket No. 71752), filed Nov. 2, 2001, for ELECTROCHEMICAL DOUBLE LAYER CAPACITOR HAVING CARBON POWDER ELECTRODES, the complete disclosure of which is incorporated herein by reference, discloses electrochemical double layer capacitors having low-resistance carbon powder electrodes.

There is also a continuing need for improved electrochemical double layer capacitors. Such improved electrochemical double layer capacitors need to deliver large amounts of useful energy at a very high power output, and very high energy density ratings within a relatively short period of time. Such improved electrochemical double layer capacitors should also have a relatively low internal resistance, and hence a relatively low characteristic RC time constant, and yet be capable of yielding a relatively high operating voltage.

Furthermore, it is apparent that improvements are needed in the techniques and methods of fabricating electrochemical double layer capacitors and capacitor electrodes so as to minimize the process steps of manufacturing the electrochemical double layer capacitor, and hence reduce associated time and costs. Likewise, technique improvements are needed as well to lower the internal resistance of the electrochemical double layer capacitor. Lowering internal resistance would result in lowering the characteristic RC time constant and maximize the operating voltage.

Since capacitor energy density increases with the square of the operating voltage, higher operating voltages thus translate directly into significantly higher energy densities and, as a result, higher power output ratings. Thus, improved techniques and methods are needed to both lower the internal resistance of the electrodes used within an electrochemical double layer capacitor and minimize fabrication process steps.

The present invention addresses the above and other needs.

SUMMARY OF THE INVENTION

The present invention advantageously addresses the needs above as well as other needs by providing an electrochemical double layer capacitor and a method of making an electrochemical double layer capacitor.

In accordance with one embodiment, the present invention can be characterized as an apparatus for use in a double layer capacitor. The apparatus has a can; a terminal post at a basal end of the can formed integral with the can and extending down from the exterior of the basal end of the can.

In accordance with another embodiment, the present invention can be characterized as an apparatus for exposing surfaces and closing gaps between windings at contact edges of an electrode assembly. The apparatus is made up of a disk; and turbine-like ridges extending radially from a center of the disk on one side of the disk for collecting the contact edges of the electrode assembly.

In a further embodiment, the present invention can be characterized as a method of making a double layer capacitor. The method has steps of providing a can having a terminal post at a basal end of the can formed integral with the can and extending from the exterior of the basal end of the can, the can having a terminal post at a basal end of the can formed integral with the can and extending from the exterior of the basal end of the can; providing an electrode assembly comprising activated carbon; and inserting the electrode assembly having electrode contact edges on proximal and distal ends of the electrode assembly into the can.

In another further embodiment, the present invention can be characterized as a method for exposing electrode contact edges on an end of an electrode assembly and closing gaps between windings at the electrode contact edges. The method includes holding the electrode assembly on a rotational axis; forcing an end of the electrode assembly into one surface of a collecting tool; and rotating the collecting tool and the electrode assembly relative to one another.

In yet a further embodiment, the present invention can be characterized as a method of making an apparatus for use in a double layer capacitor with the steps of providing metal for molding; and impact molding the metal to form a can, including: forming a terminal post at a basal end of the can integral with the can and extending down from an exterior of the basal end of the can.

In yet another embodiment, the present invention can be characterized as an apparatus for use in a double layer capacitor. The apparatus has a double layer capacitor electrode assembly having electrode contact edges on a proximal and on a distal end of the double layer capacitor electrode assembly; a top collector disk electrically coupled to the electrode contact edges of the proximal end of the double-layer capacitor electrode assembly; and a lid electrically coupled to the top collector disk.

In an additional embodiment, the present invention can be characterized as an apparatus for use in a double layer capacitor. The apparatus includes an electrode assembly having electrode contact edges on a distal end of the electrode assembly; a bottom collector disk at the distal end of the electrode assembly; and a can in which the double layer capacitor assembly is located and wherein a peripheral edge of the bottom collector disk contacts an interior wall of the can.

In yet an additional embodiment, the present invention can be characterized as a method of making an apparatus for use in a double layer capacitor including steps of electrically coupling a top collector disk to a proximal end of a double layer capacitor electrode assembly; heating a lid having a flange on a bottom of the lid; and placing the lid over a structure on the top collector disk, wherein the flange engages the structure on the top surface of the top collector disk.

In a supplemental embodiment, the present invention can be characterized as a method of making a double layer capacitor. The method has steps of electrically coupling a top collector disk to a proximal end of a double layer capacitor electrode assembly; electrically coupling a bottom collector disk to a distal end of the double layer capacitor electrode assembly; heating a can to increase a diameter of the can; inserting the double layer capacitor electrode assembly into the can; cooling the can to decrease the diameter of the can, wherein a peripheral edge of the bottom collector disk is coupled to an interior wall of the can as the diameter of the can is decreased; forming a bead around an exterior of the can at a location of the top collector disk; heating a lid to increase a diameter of a concave structure on the lid; placing the concave structure of the lid in juxtaposition with a convex structure on the top collector disk; cooling the lid to decrease the diameter of the convex structure, wherein the concave structure is coupled to the convex structure as the diameter of the can is decreased; creating a seal between the lid and the can; and placing an electrolyte solution into the electrode assembly.

A better understanding of the features and advantages of the present invention will be obtained by reference to the following detailed description of the invention and accompanying drawings, which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
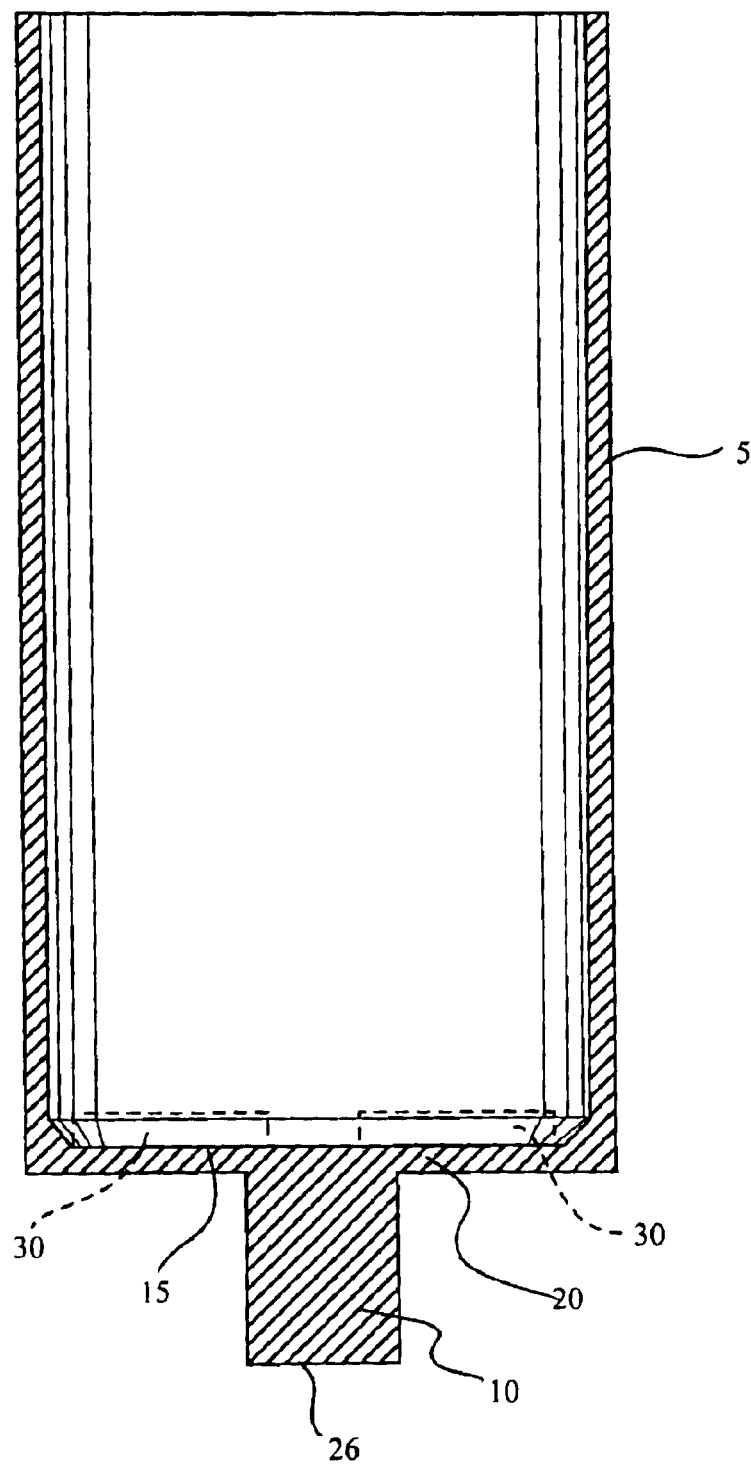
FIG. 1 is a side cross-sectional view of a cylindrical can for use in an electrochemical double layer capacitor.

Referring to FIG. 1, shown is a side cross-sectional view of a cylindrical can 5 for use in an electrochemical double layer capacitor.

Shown are a built-in terminal post 10 and collector 15 forming the basal end 20 of the can 5. The can 5 is for housing a jellyroll electrode assembly 25 (as shown in FIG. 3). In accordance with the present embodiment, the jellyroll electrode assembly 25 is prepared in accordance with the process described, for example, in previous U.S. patent applications Ser. No. 09/569,679, for ELECTROCHEMICAL DOUBLE-LAYER CAPACITOR HAVING CARBON POWDER ELECTRODES, of Nanjundiah et al., filed May 12, 2000 (Attorney Docket No. 66191), and, for example, in U.S. patent application Ser. No. 10/004,109, for ELECTROCHEMICAL DOUBLE LAYER CAPACITOR HAVING CARBON POWDER ELECTRODES, of Bendale, et al., filed Nov. 1, 2001 (Attorney Docket No. 70652), the entire contents of both of which are hereby incorporated in by reference. Alternatively, as will be recognized by one of ordinary skill in the art, numerous other types of electrode assemblies for electrochemical double layer capacitors may be used. For example, electrode assemblies employing metal impregnated carbon cloth electrodes are contemplated.

Use of the cylindrical can 5 advantageously requires less parts, fewer process steps for assembly, is lower in cost and provides lower resistance than prior structures and approaches for electrochemical double layer capacitors.

In accordance with the present embodiment, the cylindrical can 5 (which, as an alternative, may have a shape other than that of a cylinder) is impact molded. During impact molding, the terminal post 10 and collector 15 are formed integral with the cylindrical can 5.

The terminal post 10 may have a diameter of approximately 0.625 inches.

The can 5 may be made, for example, from aluminum and have a wall thickness of 0.040 inches. The diameter of the can 5 may be, for example, 2.5 inches and the length of the can 5 may be, for example, 6 inches.

A solid boss 26 that forms the terminal post 10 is located at the basal end 20 of the can 5 and is integral with the can 5.

There are wedge-like bars 30 formed on the basal end 20 in the interior of the can 5 (shown in FIGS. 4A and 4B in further detail). The basal end 20 of the can and these wedge-like bars serve as the integral collector 15.

Figure 2:
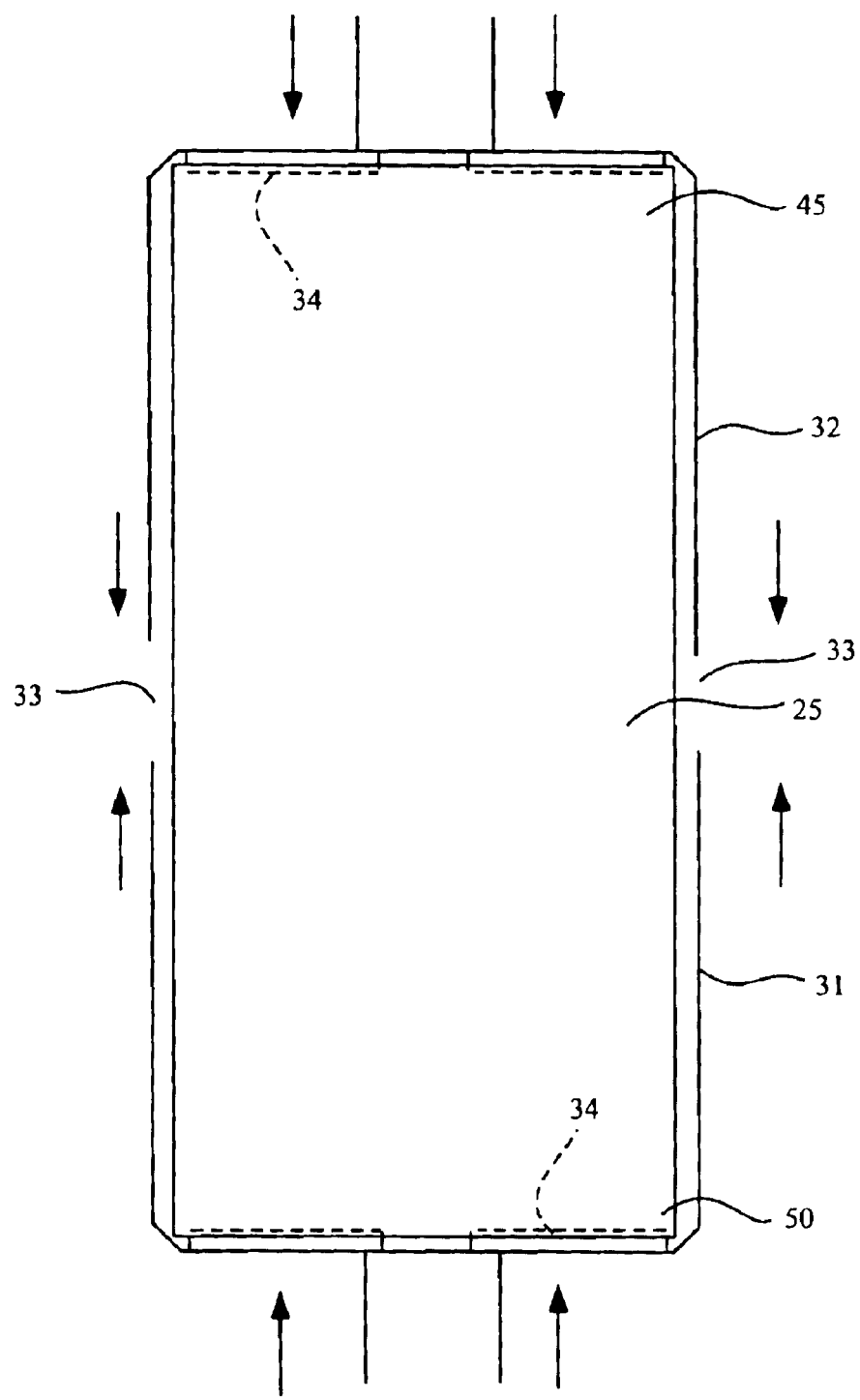
FIG. 2 is a side cross sectional view of a tool for collecting respective contact edges of electrodes of a jellyroll electrode assembly prior to insertion into the cylindrical can of FIG. 1.

Referring next to FIG. 2, shown is a side cross sectional view of a tool for collecting respective contact edges of electrodes of a jellyroll electrode assembly 25 prior to insertion into the cylindrical can 5 of FIG. 1.

The collecting tool is used to produce mechanical gathering or "collecting" of the jellyroll electrode assembly ends 45, 50. This tends to collect surfaces of the contact edges of the jellyroll electrode assembly ends 45, 50 and to close gaps between windings at the contact edges (not shown). The closing of such gaps tends to reduce resistance between windings of the jellyroll electrode assembly 25 by collecting contact edges of adjacent windings of each electrode at each end 45, 50 of the jellyroll electrode assembly 25. The exposing of the surfaces of the contact edges tends to reduce resistance between the contact edges and a corresponding collector disk (whether integral with the can or not).

Shown in FIG. 2 are two cylindrical cans 31, 32 identical to the can 5 of FIG. 1, except each can interior is less than half the length of the interior of the can 5. Also shown is a jellyroll electrode assembly 25.

The cans 31, 32 are located on each end of the jellyroll electrode assembly 25 and are not so long as to entirely enclose the jellyroll electrode assembly. Therefore, a gap 33 is left between the two proximal ends of the cans 31, 32.

By way of operation, sufficient pressure is applied to the basal end of each can 31, 32 in opposite directions to close the gap 33 between the cans 31, 32 resulting in pressure being applied against the ends of the jellyroll electrode assembly 25. This results in the collection of the respective contact edges of electrodes on each end of the jellyroll electrode assembly 25. This effect is produced for the most part by the pressure applied to the ends of the jellyroll electrode assembly 25 by the wedge-like bars 34 that extend radially from centers of the interior basal ends of the cans 31, 32 toward interior peripheral edges of the basal ends of the cans 31, 32. The wedge-like bars 30 also serve to align foils on the ends of the electrode assembly 25 for improved laser welding of the can 5 and collector plate 90 (shown in FIG. 6) to the jellyroll electrode assembly 25.

Figure 3A:
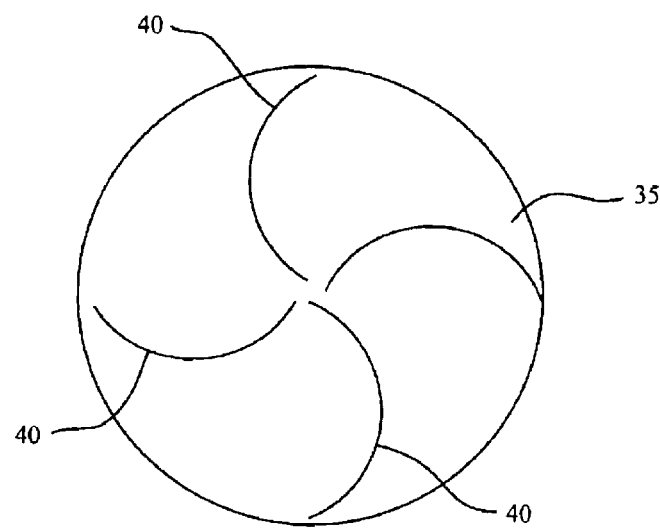
FIG. 3A is a top view of an alternative collecting tool for collecting respective contact edges of electrodes of a jellyroll electrode assembly prior to insertion into the cylindrical can of FIG. 1.

Referring next to FIG. 3A, shown is a top view of an alternative tool for collecting respective contact edges of electrodes of a jellyroll electrode assembly prior to insertion into the cylindrical can 5 by way of "smearing" the contact edges.

The collecting tool 35 is in the form of a disk having "turbine-like" ridges 40 extending radially on one side of the disk.

Figure 3B:
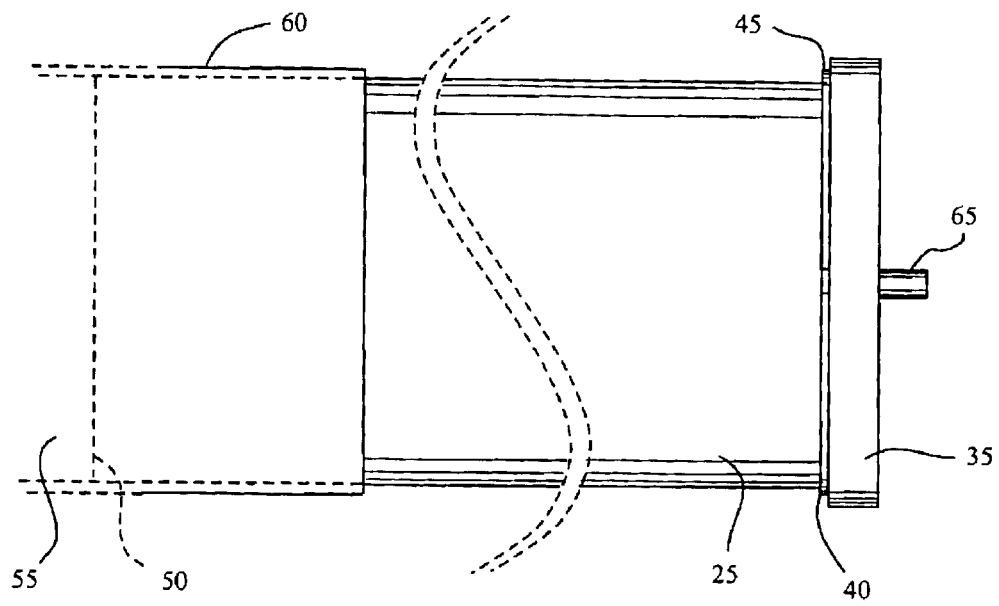
FIG. 3B is a side view of a plunger, a cylinder, the jellyroll electrode assembly, the collecting tool of FIG. 3A and a lathe assembled for performing the "collecting"

Referring next to FIG. 3B, shown is a side view of a plunger 55, cylinder 60, jellyroll electrode assembly 25, collecting tool 35 and lathe 65 assembled for performing the "smearing".

The jellyroll electrode assembly 25 is held in a cylinder 60. Axial force is applied by a plunger 55 to force the contact edges of the end 45 of the jellyroll electrode assembly 25 into the one surface of the collecting tool 35 that has the turbine-like ridges 40. While the collecting tool 35 is held fixed (rotationally), jellyroll electrode assembly 25 is rotated on the lathe 65. This causes the contact edges of the jellyroll electrode assembly 25 at the end 45 of the jellyroll electrode assembly to be "smeared", or gathered, resulting in the collecting of the contact edges of the jellyroll electrode assembly, thereby reducing the contact resistance between windings of the jellyroll electrode assembly and the collector plate 90 (shown in FIG. 6). This operation is performed on both ends 45, 50 of the jellyroll electrode assembly.

Figure 4:
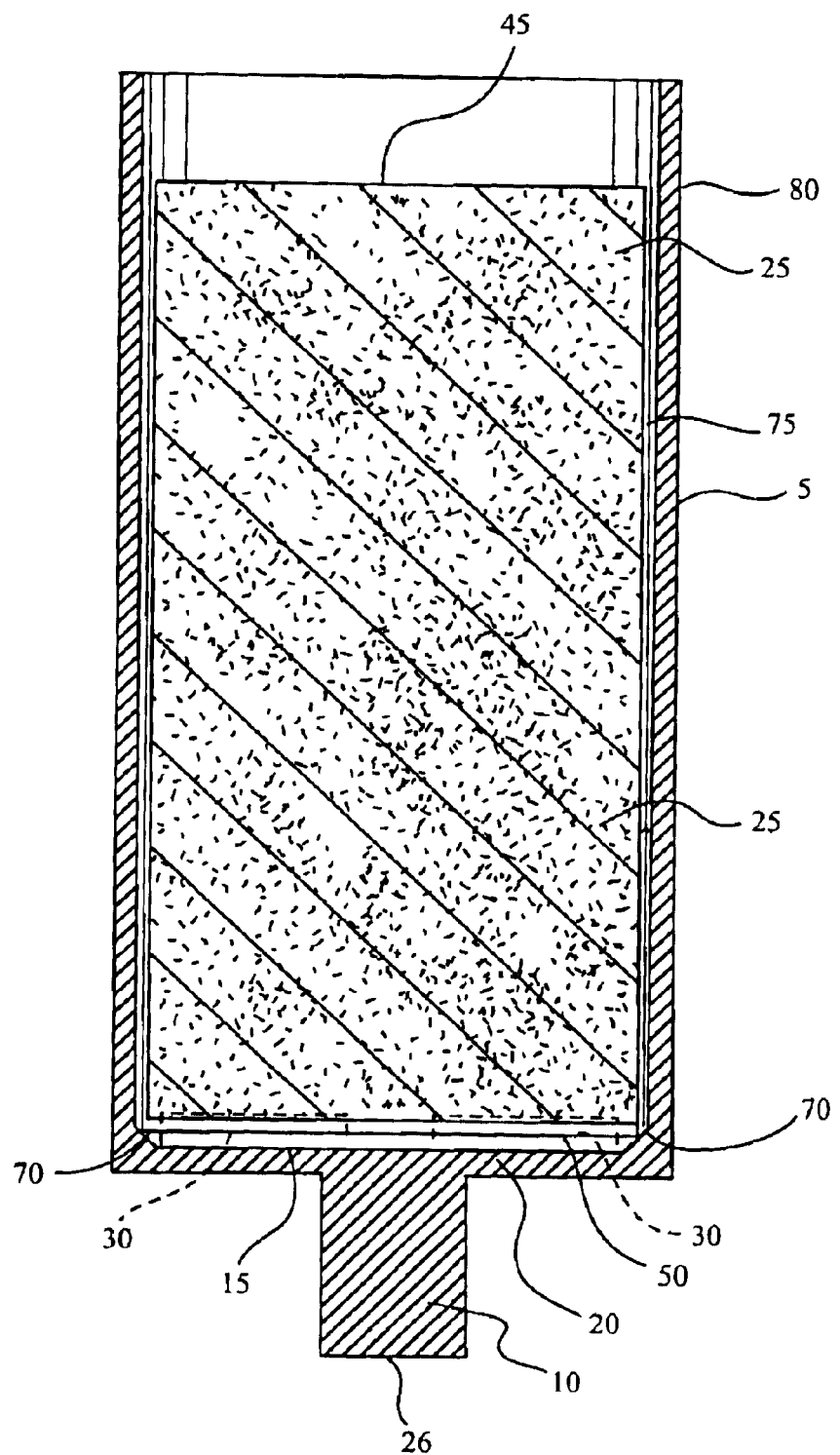
FIG. 4 is a side cross-sectional view of the cylindrical can of FIG. 1 housing the jellyroll electrode assembly.

Referring next to FIG. 4, shown is a side cross-sectional view of the cylindrical can 5 of FIG. 1 housing the jellyroll electrode assembly 25.

Figure 5A:
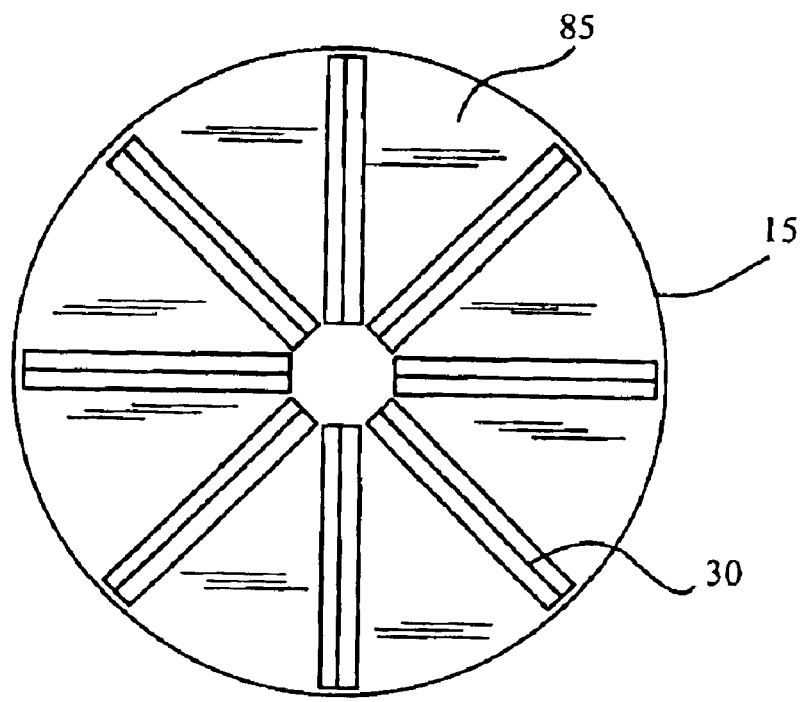
FIG. 5A is a top view of the interior basal end of the can of FIG. 1.

Shown are the cylindrical can 5 of FIG. 1, the integral collector 15 and the integral terminal post 10. The jellyroll electrode assembly 25 of FIG. 3B is shown within the cylindrical can 5. Also, shown is a taper 70 at a periphery of an interior of the cylindrical can 5 at a basal end 20 of the cylindrical can 5. (A top view of the interior basal end 20 of the can 5 is shown in FIG. 5A, described hereinbelow).

Once "collecting" of the contact edges at the ends 45, 50 of the jellyroll electrode assembly 25 is complete, the jellyroll electrode assembly 25 is brought down into the cylindrical can 5. A distal end 50 of the jellyroll electrode assembly 25 contacts the integral collector 15 with the wedge-like bars 30. The taper 70 at the periphery of the interior basal end 20 of the cylindrical can 5 centers the jellyroll electrode assembly 25 in the cylindrical can 5.

The jellyroll electrode assembly 25 preferably comprises a porous separator material that separates, i.e., prevents electrical contact between, the electrodes of the jellyroll electrode assembly, but further includes such porous separator material 75 on its exterior that separates, i.e., prevents electrical contact between, an electrode at an exterior of the jellyroll electrode assembly an the interior of the cylindrical can 5.

The contact edges at ends 45, 50 of the jellyroll electrode assembly 25 are taped with insulating tape (which maybe of the same material as the porous separator material) for mechanical integrity of the jellyroll electrode assembly, i.e., to prevent the jellyroll electrode assembly from unrolling (unwinding) during handling, and to insulate the contact edge at ends 45, 50 of outermost windings of the electrodes of the jellyroll electrode assembly 25 from the interior 80 of the cylindrical can 5 (particularly at the proximal end 45 of the jellyroll electrode assembly 25, which is of an opposite polarity from the cylindrical can).

Referring next to FIG. 5A, shown is a top view of the interior basal end 85 of the can 5 of FIG. 1.

The interior basal end 85 forms the collector 15 integral with the can 5. The wedge-like bars 30 extend radially from a center of the interior basal end 85 toward an interior peripheral edge of the basal end of the cylindrical can. The taper encircles the basal end of the can and the wedge-like bars 30.

Figure 5B:
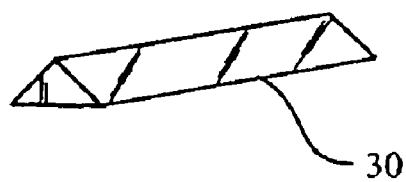
FIG. 5B is a perspective isometric view of one of the wedge-like bars of FIG. 5A.

Referring next to FIG. 5B, shown is a perspective isometric view of one of the wedge-like bars 30 of FIG. 5A.

The wedge-like bars 30 serve to decrease contact resistance by increasing force per unit area between the distal end 50 of the jellyroll electrode assembly, and the wedge-like bars 30. (If this same force was spread over the entire interior basal end of the cylindrical can, the force per unit area between the distal end 50 of the jellyroll electrode assembly and the interior basal end of the cylindrical can the would be substantially lower.) Thus, these wedge-like bars 30 decrease contact resistance by increasing force against the contact edge at the distal end 50 of the jellyroll electrode assembly 25 when the jellyroll electrode assembly is brought down into the cylindrical can 5 (as shown in FIG. 4). Pressure against the wedge-like bars 30 is elevated by, in effect, decreasing the surface area against which force is applied at the contact edge at the distal end 50 of the jellyroll electrode assembly 25.

Figure 6:
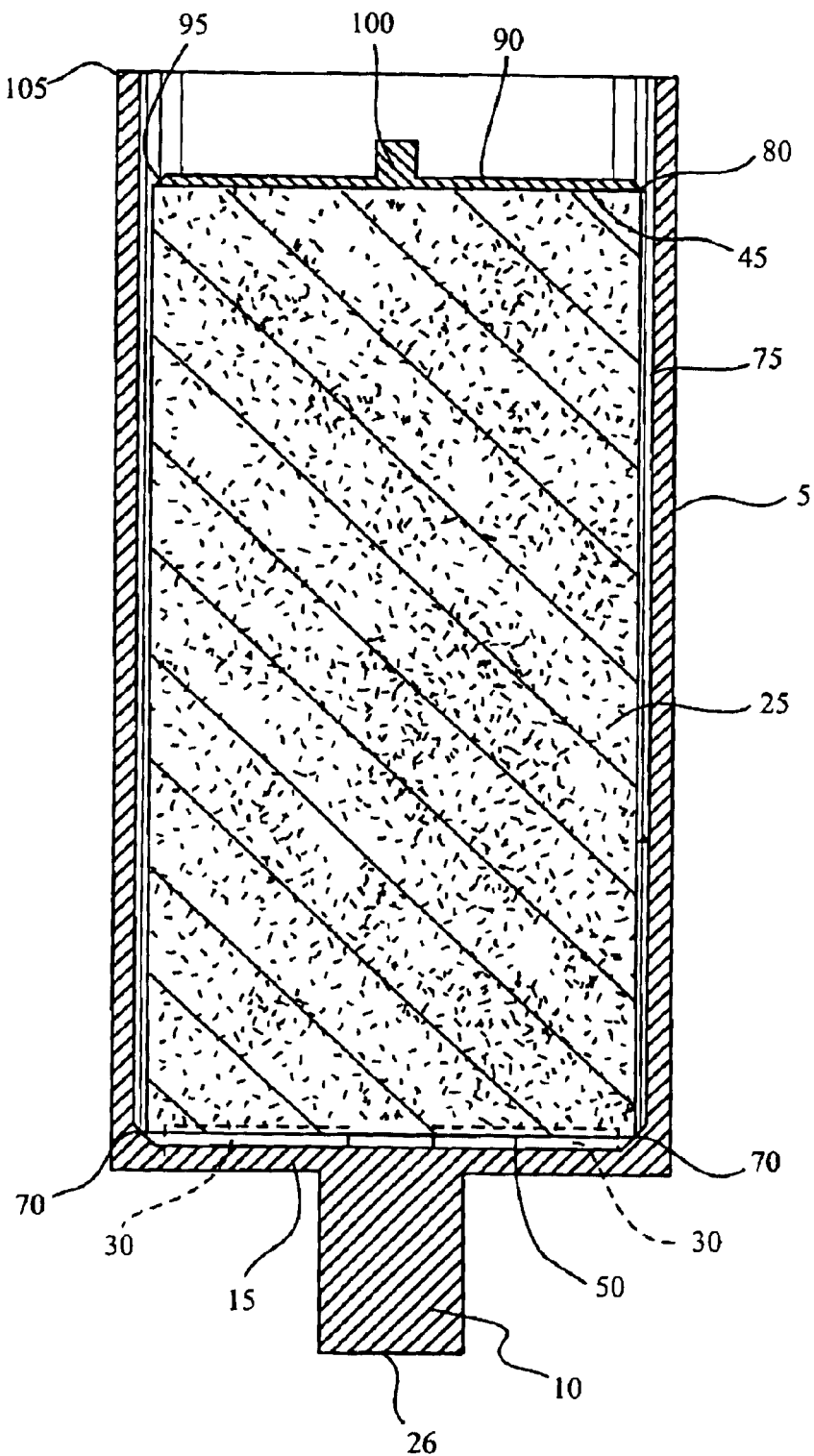
FIG. 6 is a side cross-sectional view of the cylindrical can of FIG. 4 housing the jellyroll electrode assembly with a collector disk on the proximal end of the jellyroll electrode assembly.

Referring next to FIG. 6, shown is a side cross-sectional view of the cylindrical can 5 of FIG. 3 housing the jellyroll electrode assembly 25 with a collector disk 90 on the proximal end 45 of the jellyroll electrode assembly 25.

Shown are the cylindrical can 5 of FIG. 1, the integral collector 15 and terminal post 10, the jellyroll electrode assembly 25 of FIG. 4 within the can 5, and the collector disk 90 affixed on the proximal end 45 of the jellyroll electrode assembly 25. Also, shown is a first insulating gasket 95 around the perimeter of the collector disk 90. At the center of the collector disk 90 is a nub 100 (e.g., frustoconical in shape) formed integral with the collector disk 90. The nub 100 tapers as it extends upward away from the surface of the collector disk 90 and may have a diameter smaller than 0.625 inches at its base. The nub 100 does not extend beyond the lip 105 of the can 5 in the present embodiment.

The first insulating gasket 95 is placed on the perimeter of the collector disk 90 to insulate the collector disk 90 from the inside surface 80 of the can 5 and to provide a seal between the jellyroll electrode assembly 25 and the collector disk 90. The first insulating gasket is preferably made of either polypropylene or polyethylene to decrease the permeation of $H_2O$ and $O_2$.

Once the jellyroll electrode assembly 25 is inserted into the can 5 as described above, the collector disk 90 is then placed on the proximal end 45 of the jellyroll electrode assembly 25.

Figure 7:
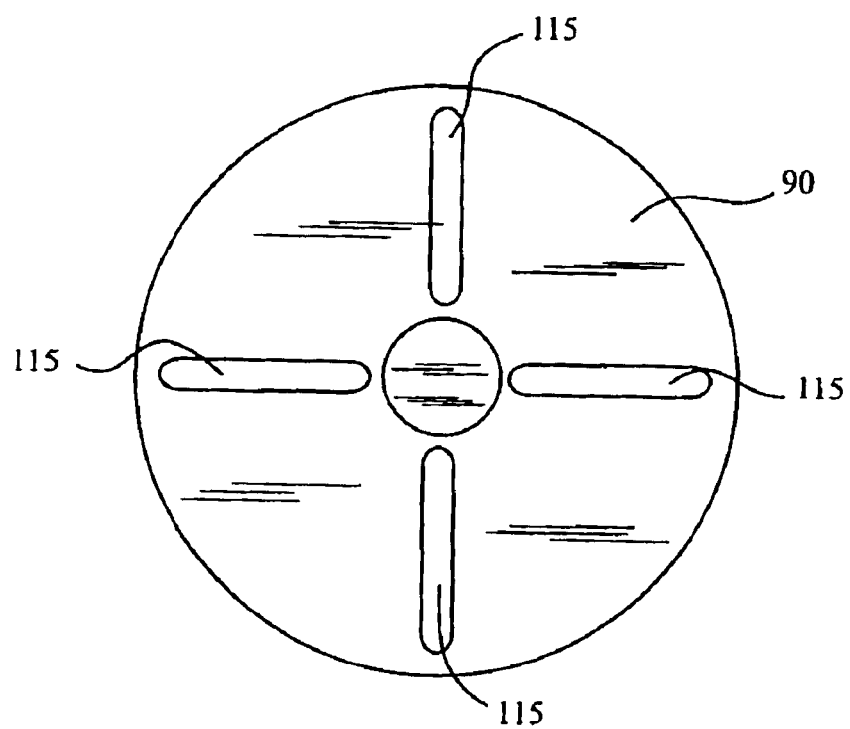
FIG. 7 is a top view of the collector disk of FIG. 6.

Referring to FIG. 7, shown is a top view of the collector disk 90 of FIG. 6. Shown is the collector disk with a plurality of slots 115, 4 in this case, extending radially from the center of the disk 90.

The slots 115 in the collector disk 90 are used for laser welding the collector disk 90 to the contact edges exposed at the proximal end 45 of the jellyroll electrode assembly 25 such that there is electrical contact made between the contact edges of the electrode at the proximal end 45 of the jellyroll electrode assembly and the collector disk 90. The use of the collector disk 90 of the present embodiment allows for lower contact resistance between the jellyroll electrode assembly and the collector disk (by maximizing surface area of contact with the jellyroll electrode assembly 25) and tolerance of axial (i.e., length) and rotational (i.e., normalcy of the jellyroll electrode assembly) inconsistencies between jellyroll electrode assemblies. Furthermore, the utilization of the collector disk results in free volume at the proximal end 45 of the jellyroll electrode assembly, which serves as a space for, for example, $H_2$ evolution during charging of the electrochemical double layer capacitor.

Optionally, there may be wedge-like bars (not shown) formed on the bottom of the collector disk 90 that extend radially from a center of the collector disk and contact the proximal end of the jellyroll electrode assembly much like those on formed on the integral collector 15 at the basal end 50 of the can 5 contact the distal end of the jellyroll electrode assembly. In the same manner, the wedge-like bars at on the collector disk also decrease contact resistance by increasing the force per unit area between the contact edges of the electrode at the proximal end 45 of the jellyroll electrode assembly 25 and the collector disk. They also serve to align foils at the proximal end 45 of the jellyroll electrode assembly 25 for laser welding and eliminating the need for "smearing" the end 45 of the jellyroll electrode assembly 25.

Figures 8B, 8C:
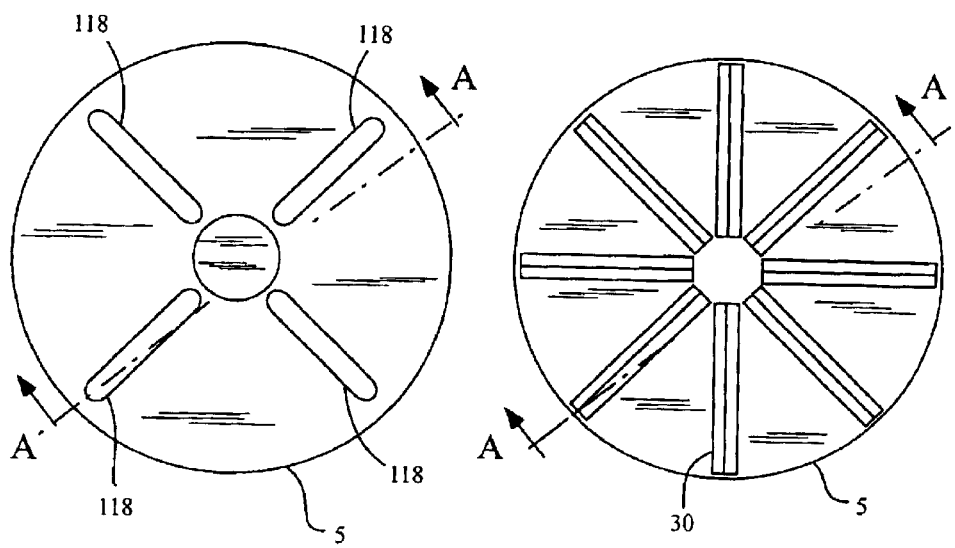
FIG. 8B is a bottom planar view of the can of FIG. 8A.
FIG. 8C is a top planar view of the interior basal end of the can of FIG. 8A.
Figure 8A:
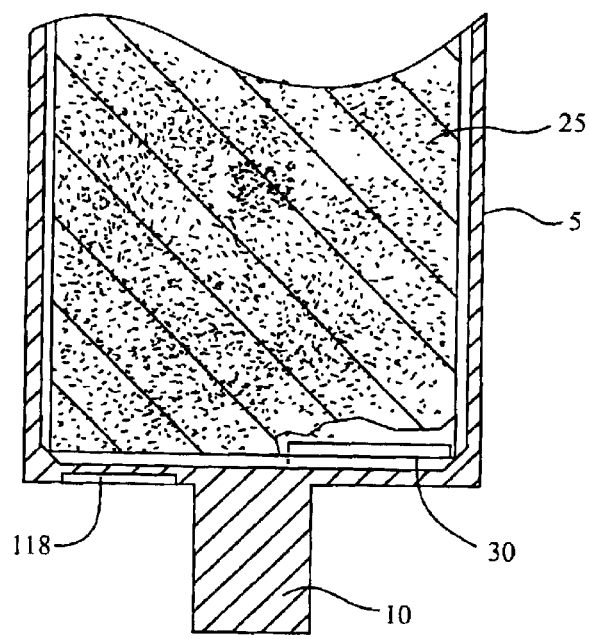
FIG. 8A is a partial side view of a cross section taken along line A—A of FIGS. 8B and 8C of an alternative embodiment of the cylindrical can of FIG. 6 housing the jellyroll electrode assembly.

Referring next to FIGS. 8A through 8C, shown are multiple views of an alternative embodiment of the cylindrical can 5 of FIG. 6 housing the jellyroll electrode assembly 25. FIG. 8A is a partial side view of a cross section taken along line A—A of FIGS. 8B and 8C. FIG. 8B is a bottom planar view of the can 5, and FIG. 8C is a top planar view of the interior basal end of the can 5 of FIG. 8A without the jellyroll electrode assembly 25.

The alternative embodiment of FIGS. 8A through 8C is similar in structure, manufacture and application to the embodiment of FIG. 4 except the can 5 of the alternative embodiment has a plurality of obround channels 118 located on the bottom of the basal end of the can 5. These channels 118, four in this case, extend radially from a center of the basal end of the can 5 and serve to aid in the laser welding of the jellyroll electrode assembly 25 to the interior basal end of the can 5 after the electrode assembly is placed in the can 5. Each channel 118 is located between the ridges 30 on the opposite side of the can 5 as the ridges 30. The remainder of the construction of the capacitor using the alternative embodiment of FIGS. 8A through 8C of the can 5 may be completed in accordance with the procedures described herein using the can 5 of FIG. 6.

Figure 9:
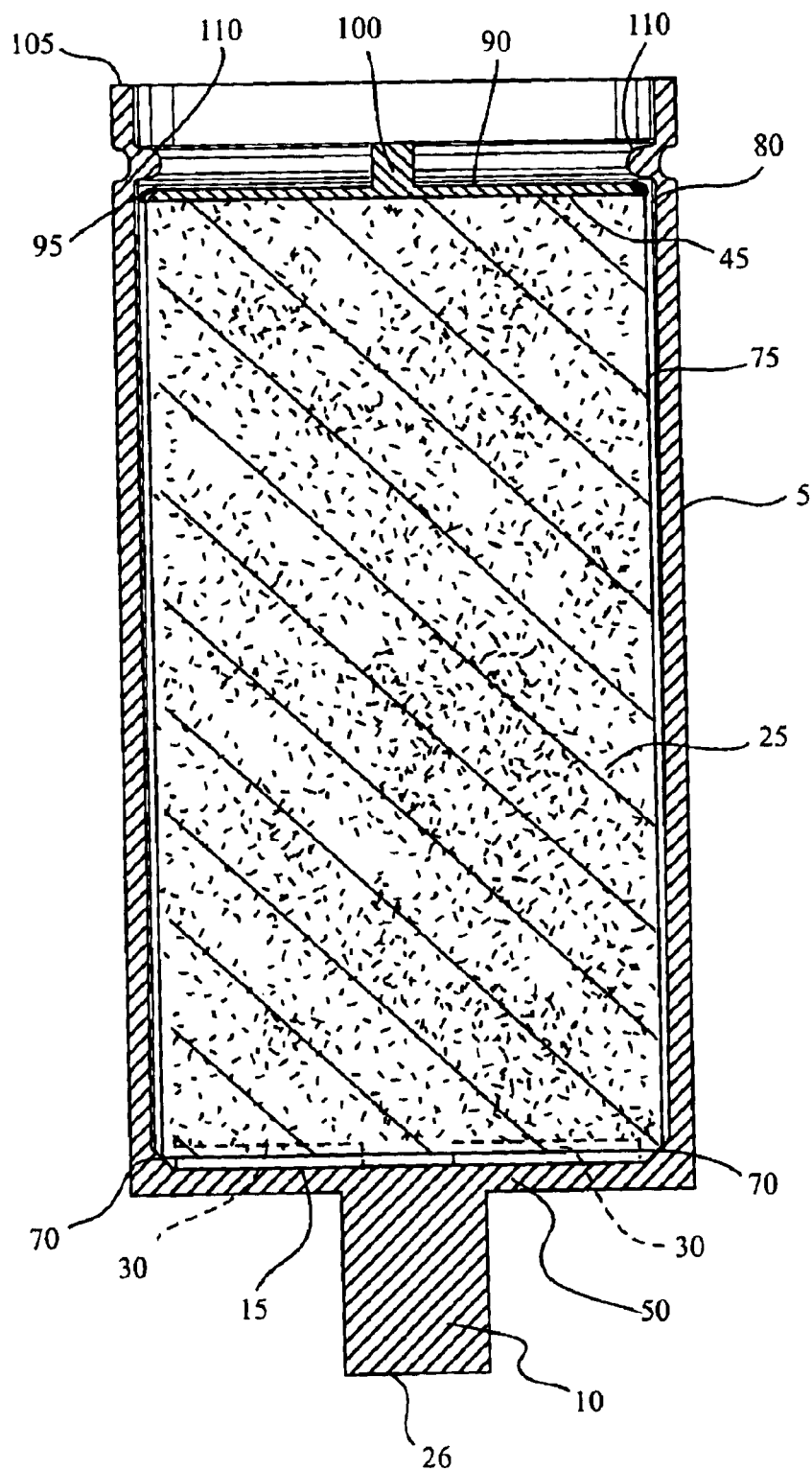
FIG. 9 is a side cross-sectional view of the cylindrical can of FIG. 6 with a bead formed around the can at the collector disk.

Referring now to FIG. 9, shown is a side cross-sectional view of the cylindrical can 5 of FIG. 6 with a bead 110 formed around the can 5 at the collector disk 90.

Shown are the cylindrical can 5 of FIG. 6, and the integral collector 15 and terminal post 10 integral with the can 5. Also shown are the jellyroll electrode assembly 25 of FIG. 3B within the cylindrical can 5 and the collector disk 90 affixed on the proximal end 45 of the jellyroll electrode assembly 25 with an insulating gasket 95 around perimeter of the collector disk 90.

The bead 110 is formed around the can 5 making an interior section of the can bend inward to come in contact with and apply pressure, or a pre-load, to the first insulating gasket 95 on the collector disk 90. This bead 110 thereby applies downward pressure to hold the collector disk 90 and the jellyroll electrode assembly 25 in place. The collector disk 90 that has previously been placed on the on the proximal end 45 of the jellyroll electrode assembly 25 is then affixed to the jellyroll electrode assembly 25 by laser welding. This is done after the bead 110 is formed to assure electrical contact between the collector disk 90 and the proximal end 45 of the jellyroll electrode assembly 25. (Thus, the laser welding also assures the collector disk 90 stays in electrical contact with the contact edges on the proximal end 45 of the jellyroll electrode assembly).

Figure 10:
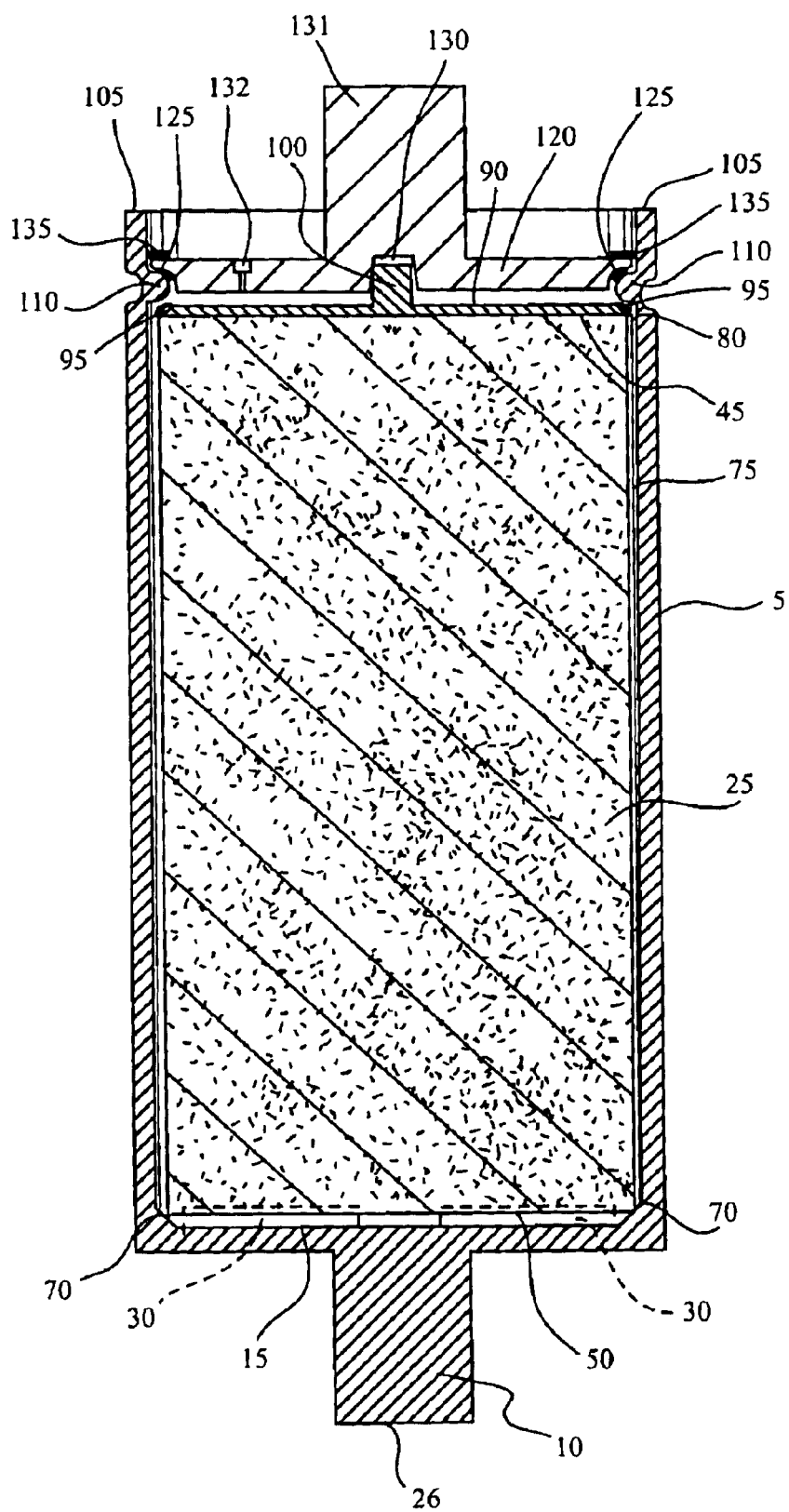
FIG. 10 is a side cross-sectional view of the cylindrical can of FIG. 9 with a lid assembly placed over the bead formed around the can at the collector disk.

Referring next to FIG. 10, shown is a side cross-sectional view of the cylindrical can 5 of FIG. 9 with a lid assembly placed over the bead formed around the can at the collector disk.

Shown are the cylindrical can 5 of FIG. 9, and the integral collector 15 and terminal post 10 integral with the can 5. The jellyroll electrode assembly 25 of FIG. 9 is shown within the can 5 along with the collector disk 90 affixed on the proximal end 45 of the jellyroll electrode assembly 25 with a first insulating gasket 95 around its perimeter. A bead 110 is shown formed around the can 5 with an o-ring gasket 125 placed into the open end of the can 5 against the interior of the bead 110. On top of the o-ring gasket 125 is placed a lid 120 with a hole 130 positioned over, and in electrical contact with, the nub 100 of the collector disk 90. A terminal post 131 extends upward from the center of the lid and a hole 132 through the lid 120 leading into the can 5 serves as a fill port for an electrolyte solution (shown in detail in FIG. 10A).

A second insulating gasket 135 is placed around a perimeter of the lid 120 to insulate the lid 120 from the can 5 and to form a seal. The second insulating gasket 135 is preferably made of Tefzel. A seal is formed between the lid 120, o-ring gasket 125 and interior of the bead 110. The hole 130 in the lid 120 is substantially the same shape as the nub 100 of the collector disk 90 such that a top portion of the nub 100 fits within the hole 130, thereby making an electrical contact between the lid 120 and the collector disk 90. This also helps the lid 120 and cylindrical can 5 tolerate axial and rotational tolerances that may be present in the jellyroll electrode assembly.

Figure 11:
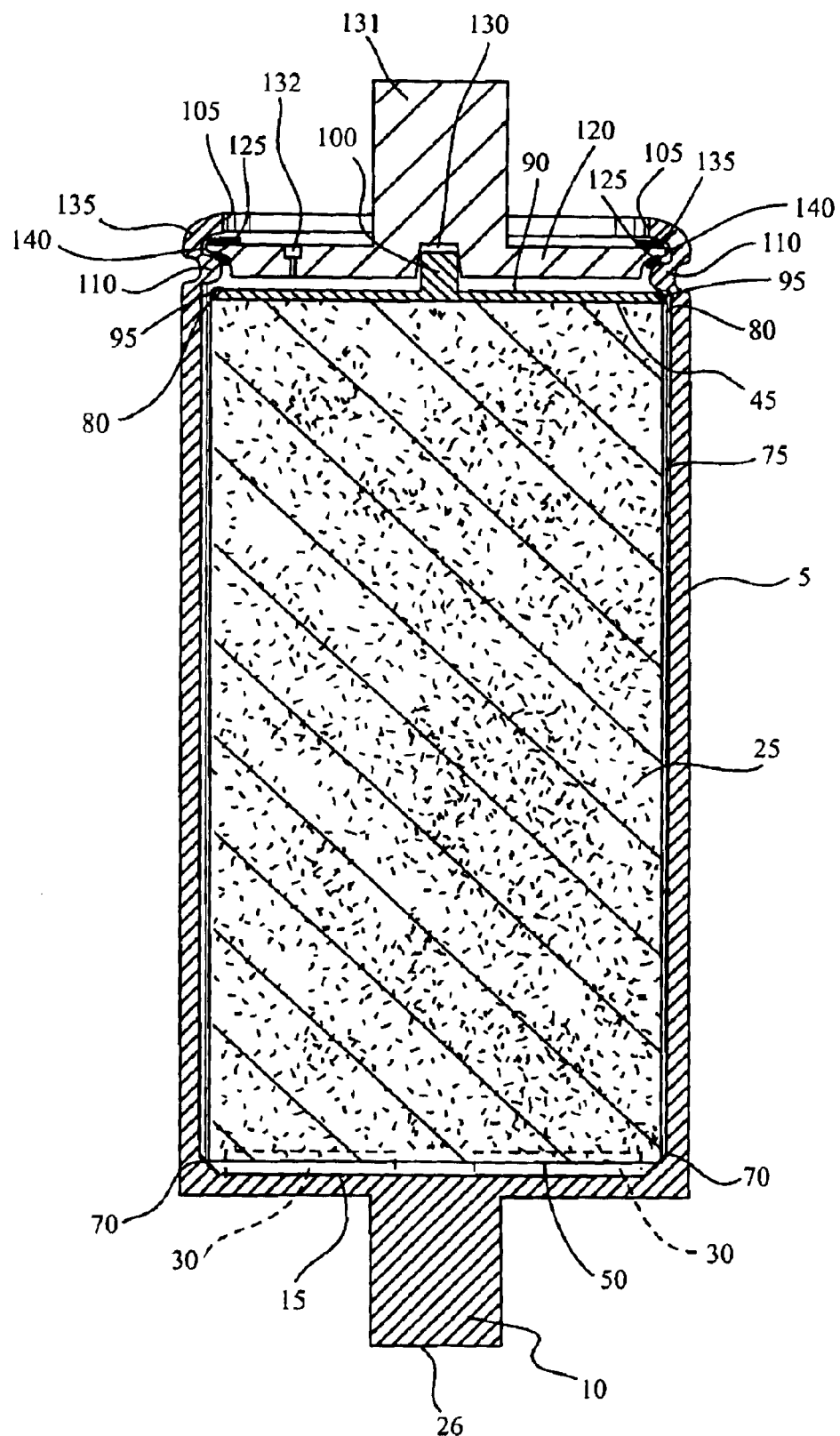
FIG. 11 is a side cross-sectional view of the cylindrical can of FIG. 10 with a crimp seal formed over a peripheral edge of the lid assembly to secure a lid assembly to the can.

Referring next to FIG. 11, shown is a side cross-sectional view of the cylindrical can 5 of FIG. 1 employing a crimp seal 140 to secure the lid 120 to the can 5.

Shown are the cylindrical can 5 of FIG. 1, the built in collector 15 and terminal post 10 integral with the can 5. The jellyroll electrode assembly 25 of FIG. 4 is shown within the can 5 along with the collector disk 90 affixed on the proximal end 45 of the jellyroll electrode assembly 25 with a first insulating gasket 95 around its perimeter. Shown is a bead 110 formed around the can 5 with an o-ring gasket 125 placed against the interior of the bead 110. On top of the o-ring gasket 125 is the lid 120 crimped down 140 with the lip 105 of the can 5. The lid 120 has a second insulating gasket 135, a hole 130 (e.g., frustoconical in shape) positioned over the nub 100 of the collector disk, a terminal post 131 extending upward from the center of the lid and a hole 132 through the lid 120 leading into the can 5 that serves as a fill port for an electrolyte solution (shown in detail in FIG. 12A).

Once the lid 120 is placed over the o-ring gasket 125, pressure (pre-load) is applied to the lid 120 to compress the hole 130 down onto the nub 100 of the collector disk 90. The lip 105 of the can 5 is then crimped 140 onto the rim of the lid 120, with the second insulating gasket 135 being interposed thereinbetween, so as to form a seal (for example, a hermetic seal) between the lid 120 and the can 5.

Figure 12A:
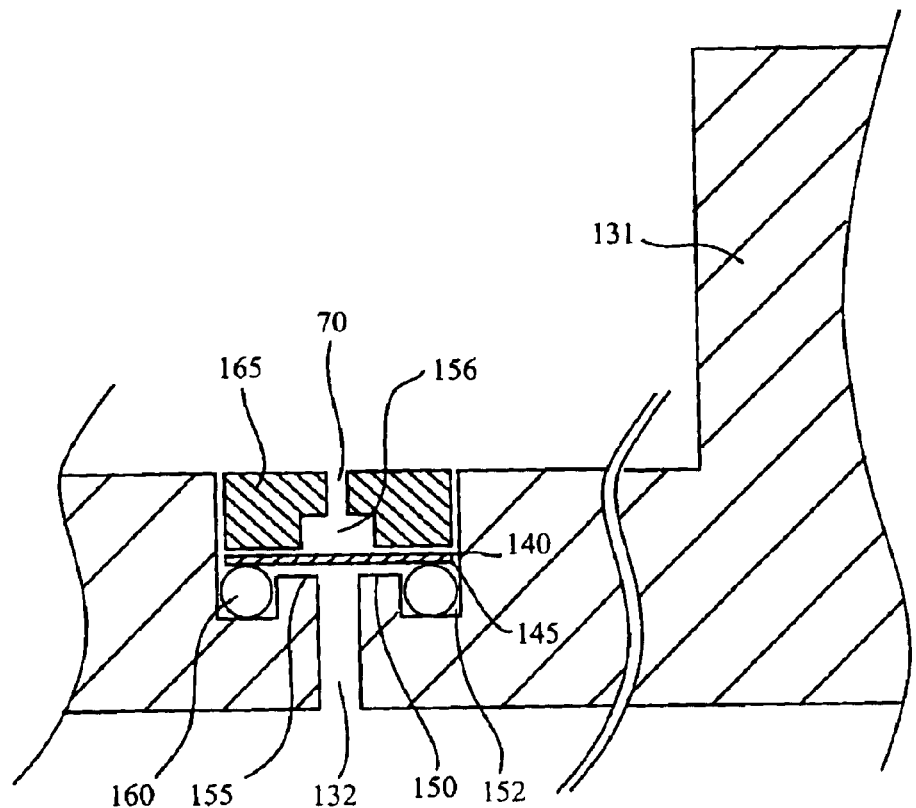
FIG. 12A is a side cross sectional view of a portion of the lid of FIG. 11, illustrating a hole and a plug.

Referring next to FIG. 12A, shown is a side cross sectional view of a portion of the lid 120 of FIG. 11, illustrating a hole and a plug.

The lid 120 has a hole 132 which leads to the can 5. The hole 132 widens approximately half way 140 through the lid 120 toward a top entrance of the hole. A bushing 160 lies in a channel 152 surrounding a flange 150 at interior edge of the hole 132 at the point where the hole widens 140. A foil seal 145 is seated on top of the bushing 160 and flange 150. This foil seal 145 covers the hole 132 at the point where the hole narrows 155 leading down to the can 5.

Figure 12B:
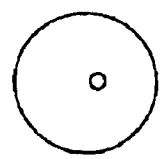
FIG. 12B is a top view of the plug of FIG. 12A.

Referring next to FIG. 12B, shown is a top view of the plug 165 shown in FIG. 12A.

A plug 165 with a small vent hole 170 down through the plug 165 is located on top of the foil 140, thereby plugging the widened section of the hole 132. The vent hole 170 widens approximately halfway down through the plug 165 forming a cavity 156 to allow the foil 145 to rupture.

The hole 132 in the lid 120 serves as a fill port for an electrolyte solution. In accordance with the present embodiment, the electrolyte solution may be made up of a solvent and a salt. A preferred solvent is acetonitrile ($CH_3CN$) and preferred salts include 1.4M tetraethyl ammonium tetrafluoro borate. Other salts may be used, such as, triethyl, methyl, ammonium, and other alkyl ammonium salts. Other solvents may include propylene carbonate, ethylene carbonate, ethyl methyl carbonate, dimethyl carbonate, methyl formate, and combinations thereof. Preferred electrolyte has a conductivity of from between ten and one hundred milli-Siemens, e.g., 66 mS, a liquidus range of −55 to 200, e.g., −55 to 87 degrees Celsius and a voltage range of greater than 2 volts.

First, the electrolyte solution is added to the can 5 through the electrolyte solution hole 132 to complete construction of the present embodiment of the capacitor. Evacuation of the can 5 may be performed prior to the adding of the electrolyte solution, so that the electrolyte solution is drawn (backfilled) into the can 5 and into the jellyroll electrode assembly 25 (FIG. 9). In particular, the electrolyte solution is drawn into the porous surfaces of the jellyroll electrode assembly 25. Some settling of the electrolyte solution may result in a need for additional electrolyte solution to be added before the foil 145, gasket 160 and plug 165 are inserted into the lid 120.

Next, the round bushing 160, is placed into the hole 132 and is seated in the circular channel 152 and against the flange 150 at the interior of the hole 132. Then the foil 145 is seated in the hole 132 on top of the bushing 160 and flange 150. Next, the plug 165, which is cylindrical in shape, is placed on top of the foil 145, which presses against the foil 145 forming the seal between the foil 145, bushing 160, and plug 165. Advantageously, the foil 145 may be selected such that it bursts when a prescribed level of pressure is reached within the can, thereby providing an overpressure safety mechanism for the double layer capacitor through the small vent hole 170 through the plug 165. The foil 145 is selected such that it will burst when the pressure level is, e.g., 90–100 PSI, thereby activating the overpressure safety mechanism. However, foil may also be selected to burst at other desired pressure levels.

Figure 13:
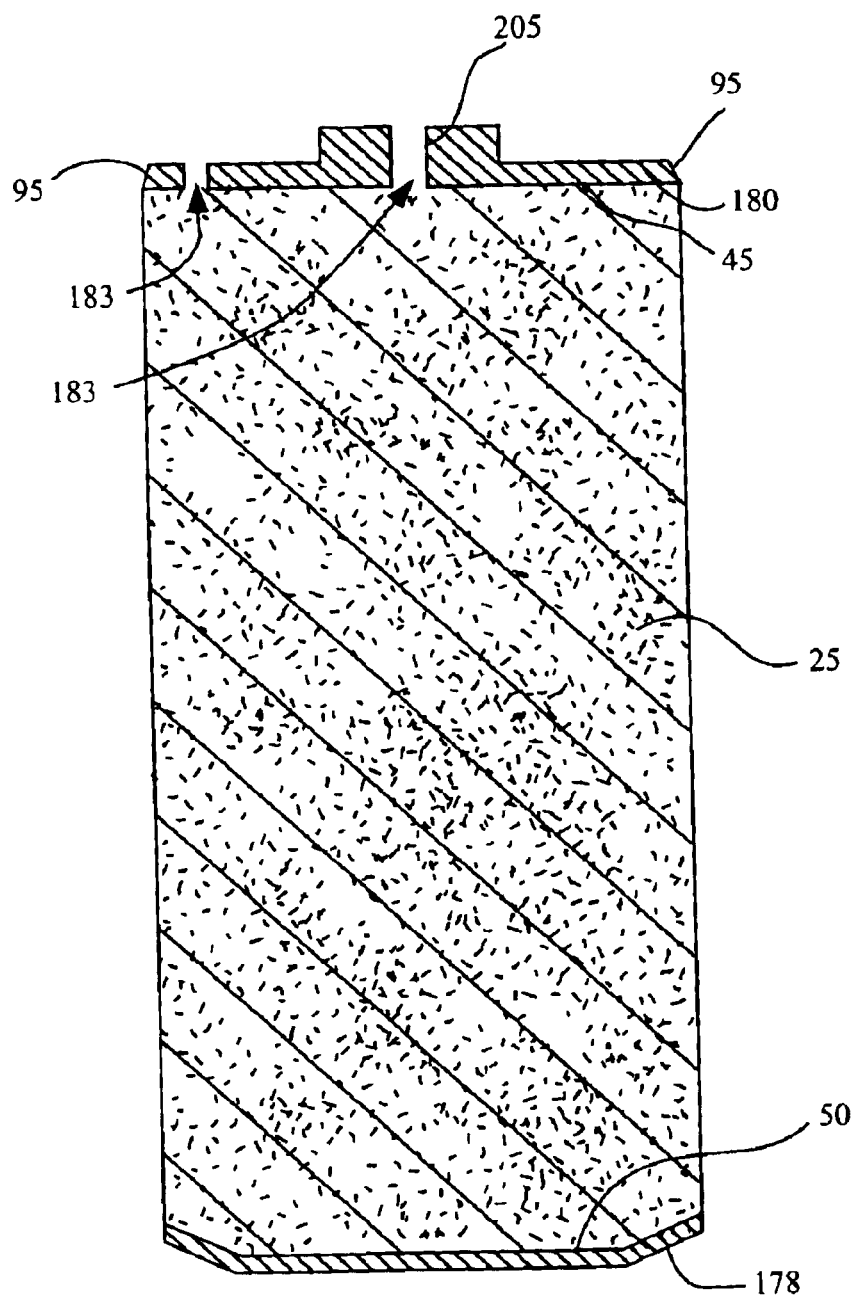
FIG. 13 is a side cross-sectional view of the jellyroll electrode assembly of FIG. 4, having a top collector disk, and a bottom collector disk in accordance with an alternative embodiment of the electrochemical double layer capacitor shown in FIGS. 1, and 4 through 12.

Referring next to FIG. 13, shown is a side cross-sectional view of the jellyroll electrode assembly of FIG. 4, having a top collector disk, and a bottom collector disk in accordance with an alternative embodiment of the electrochemical double layer capacitor shown in FIGS. 1, and 4 through 12.

The alternative embodiment is similar in structure, manufacture and application to the embodiment of FIGS. 1, and 4 through 10 except as noted herein.

The top collector disk 180 and the bottom collector disk 178 are laser welded to the jellyroll electrode assembly 25. The can 5 is heated (as described below) in order to increase the diameter of the can (through thermal expansion) and the jellyroll electrode assembly 25 is inserted into the can 5 (as shown in FIG. 14). The outer diameter of the bottom collector is similar to, e.g., the same as or slightly larger than, the inner diameter of the cylindrical can, before heating. Once the jellyroll electrode assembly 25 is inserted into the cylindrical can, the cylindrical can cools and its diameter decreases, tightening the can around the outer diameter of the bottom collector.

Figure 14A:
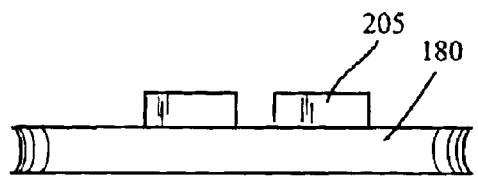
FIGS. 14A through C are a side elevation view, a top planar view and a bottom planar view, respectively, of the top collector disk of FIG. 13.
Figure 14B:
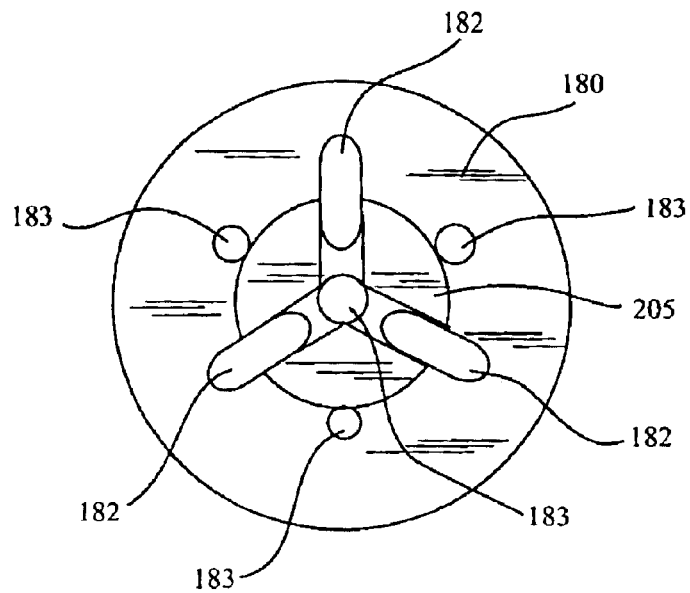
Figure 14C:
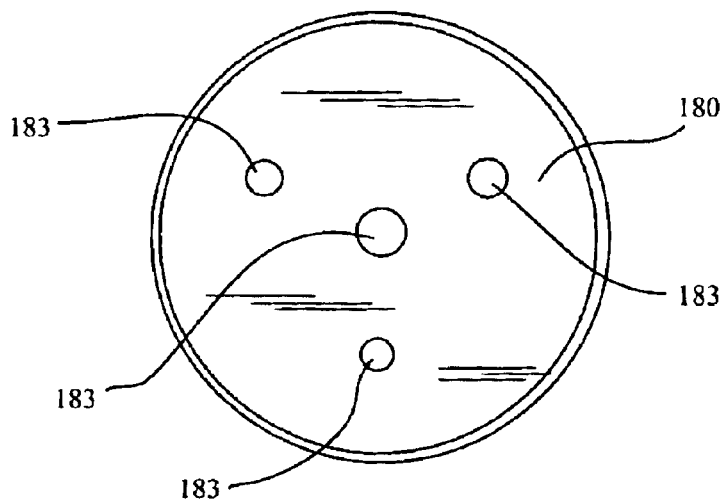

Referring next to FIGS. 14A through 14C, shown is a side elevation view, a top planar view and a bottom planar view, respectively, of the top collector disk 180 of FIG. 13.

Shown is a plurality of holes 183 to allow the passage of electrolyte solution to the jellyroll electrode assembly 25.

Also, a plurality of obround channels 182 is shown on the top surface of the top collector disk 180. These channels 182, three in this case, provide access to the contact edges of the electrode at the proximal end 45 of the jellyroll electrode assembly 25 for laser welding the top collector disk 180 to the contact edges of the electrode at the proximal end 45 of the jellyroll electrode assembly 25. Additional channels may also be used for this purpose.

The top collector disk also has a structure 205 (preferably cylindrical) that extends from an upper surface of the top collector disk 180. As explained below, the structure 205 mates with a flange on a bottom surface of a lid, each having a substantially similar diameter (i.e., the diameter of the flange being, for example, substantially the same as or slightly larger (or smaller) than the diameter of the structure, in order to provide electrical contact between the top collector disk and the lid which includes a terminal).

Figure 15A:
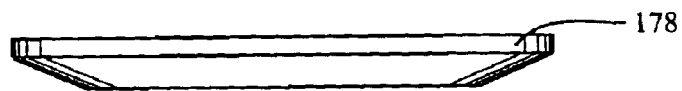
FIGS. 15A through C are a side elevation view, a bottom planar view and a top planar view, respectively, of the bottom collector disk of FIG. 13.
Figure 15B:
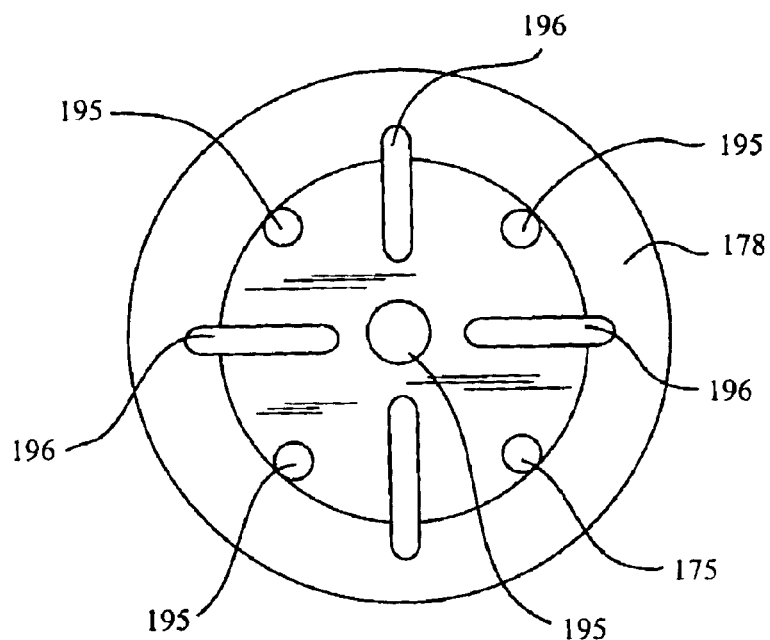
Figure 15C:
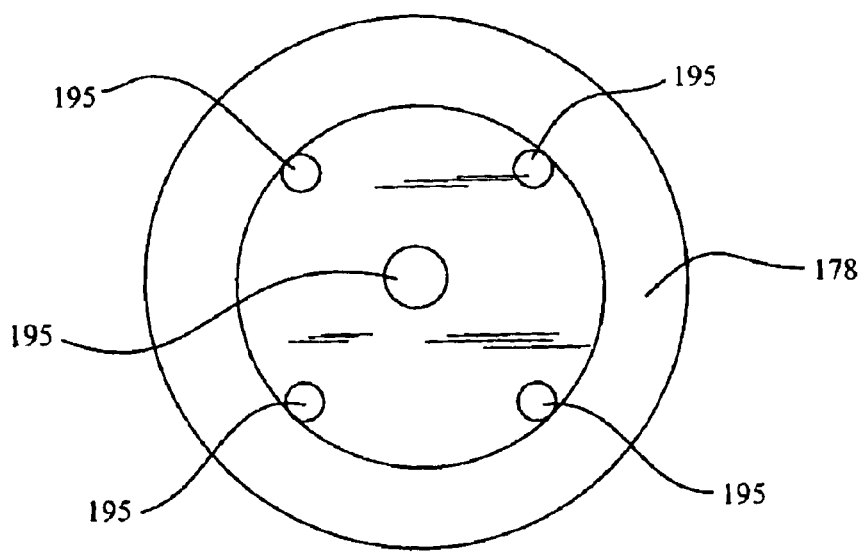

Referring next to FIGS. 15A through 15C, shown is a side elevation view, a bottom planar view and a top planar view, respectively, of the bottom collector disk 178 of FIG. 13.

Figure 16:
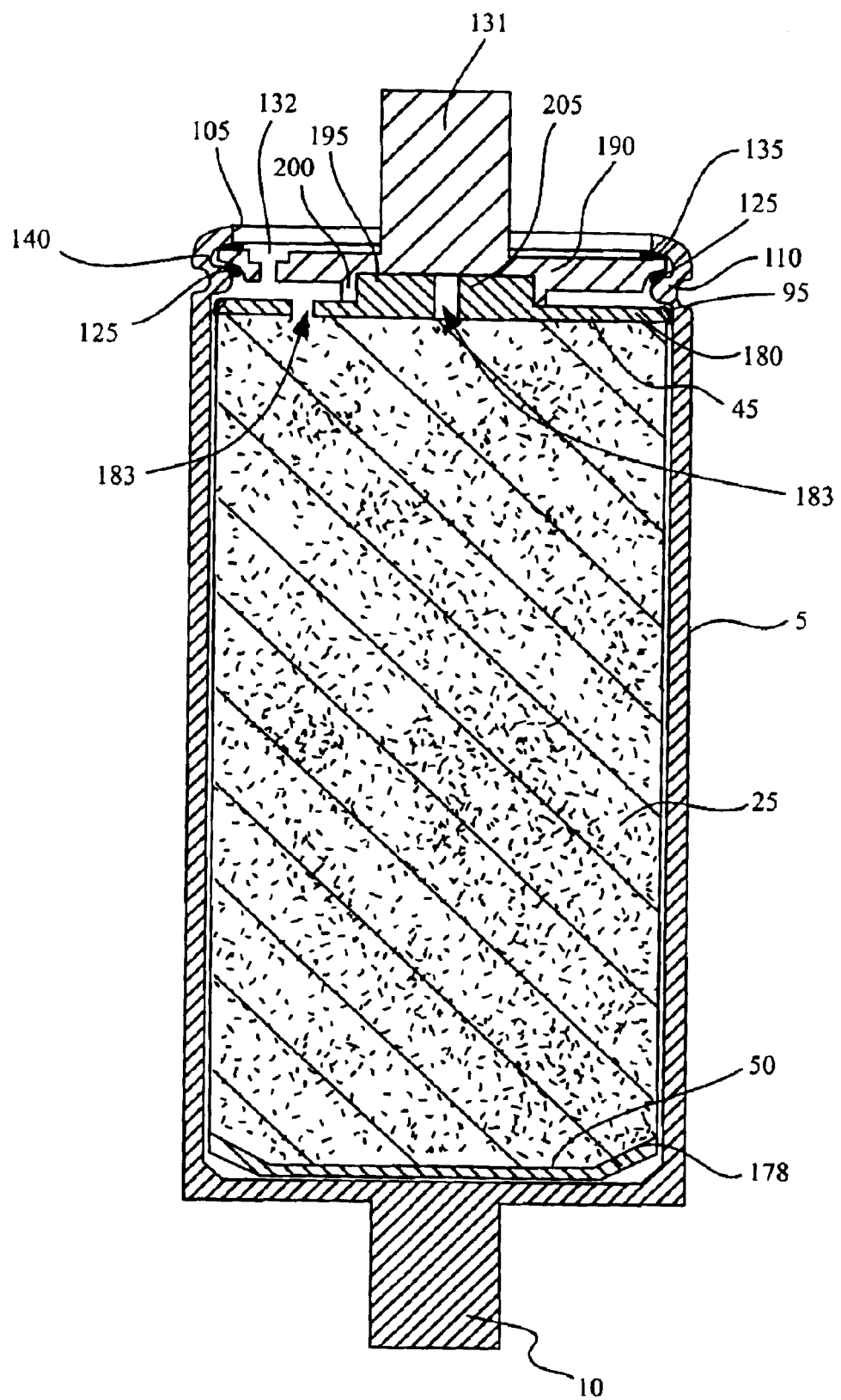
FIG. 16 is a side cross-sectional view of the jellyroll electrode assembly of FIG. 13 inserted into a cylindrical can in accordance with the alternative embodiment.

Shown also are a plurality of holes 195 and obround channels 196 to provide access to the contact edges of the electrode at the basal end 50 of the jellyroll electrode assembly 25 for laser welding the bottom collector disk 178 to the basal end 50 of the jellyroll electrode assembly 25 before it is inserted into the can 5 (as shown in FIG. 16).

An upper surface of the bottom collector disk is slightly concave, so as to receive and align the bottom collector disk with the basal end of the jellyroll electrode assembly. The concave shape is as a result of a frustoconical peripheral region surrounding a flat central region of the upper surface of the bottom collector disk.

A lower surface of the bottom collector disk is slightly convex, so as to mate with the basal end of the cylindrical can, including the taper, described above. The convex shape is as a result of a frustoconical peripheral region surrounding a flat central region of the lower surface of the bottom collector disk. The frustoconical peripheral region is similar in shape to the taper, while the flat central region is similar in shape to an interior region of the basal end of the can.

Referring next to FIG. 16, shown is a side cross-sectional view of the jellyroll electrode assembly 25 of FIG. 13 inserted into an alternative embodiment of the cylindrical can 5 of FIG. 1 and employing the lid assembly 190 of FIG. 10.

Shown is the cylindrical can 5 of FIG. 1, but employing the separate top collector disk, as well as a separate bottom collector disk 178 at a basal end of the cylindrical can 5.

A terminal post 10 is integral with the can 5. The jellyroll electrode assembly 25 of FIG. 4 is shown within the can 5 along with the top collector disk 180 electrically coupled to the proximal end 45 of the jellyroll electrode assembly 25.

A first insulating gasket 95 is located around the perimeter of the top collector disk 180.

Also shown is a bead 110 formed around the can 5 with an o-ring gasket 125 placed against an interior of the bead 110. On top of the o-ring gasket 125 is a lid 190 crimped down 140 with a lip 105 of the can 5. The lid 190 has a second insulating gasket 135.

The lid has a flange 200 (preferably circular) on a bottom side of the lid 190 with a diameter, for example, substantially the same as the diameter of the structure 205 protruding from a top surface of the top collector disk 180. Preferably, the lid 190 also has a cylindrical hole 195 (cylindrical depression, or other-shaped depression) centered on a bottom side of the lid, concentric with the flange 200, and having a diameter, for example, identical to a diameter of the flange 200.

Thus, the depression 195 has the flange 200 (or a ledge 200) at its periphery extending downward at a perimeter of the depression 195. The depression 195 is positioned over the structure 205 that extends from the upper surface of the top collector disk 180. The diameter of the depression 195 in the bottom of the lid 190, for example, is substantially the same in size and shape as, i.e., substantially the same size and shape as or slightly smaller (or larger) than the size and shape of the structure 205 on the upper surface of the top collector disk 180 (and is, e.g., larger than the diameter of the terminal post 131 that extends from the top side of the lid 190).

An electrolyte solution hole 132 (and vent hole 132) leads through the lid 120 into the can 5 and serves as a fill port for an electrolyte solution (shown in detail in FIG. 12A and described hereinabove in detail).

The bottom collector disk 178 and the top collector disk 180 are laser welded to the basal and proximal ends of the cylindrical can 5, respectively.

The cylindrical can 5 is then induction heated (or alternatively heated in an oven) to a temperature sufficient to expand the diameter of the cylindrical can enough to fit the bottom collector disk 178 into the cylindrical can 5 (the bottom collector disk 178 having an outer diameter substantially the same as less than the interior diameter of the cylindrical can 5). The jellyroll electrode assembly 25 is then placed in the cylindrical can such that the bottom collector disk 178 comes into contact with the interior of the basal end of the cylindrical can 5. Upon cooling of the cylindrical can the interior diameter of the can decreases and tightens against the periphery of the bottom collector disk 178, i.e., as the sides of the cylindrical can 5 press against a peripheral edge of the bottom collector disk 178, holding the bottom collector disk by tension created as the cylindrical can 5 contracts.

The lid 190 is then heated as well, preferably in a oven, or alternatively by induction heating. Such heating results in an increase in diameter of the depression and the flange. Next, the lid is placed over the o-ring gasket 125 and the top collector disk 180. The depression 195 and flange of the bottom of the lid 190 are placed over the structure 205 of the top collector disk 180. As the lid cools, the depression and the flange 200 of the lid 190 are held to the structure 205 by tension created when the lid 190 contracts after heating, thus causing a reduction in the diameter of the depression and the flange.

The lip 105 of the can 5 is then crimped 140 onto the rim of the lid 190, with the second insulating gasket 135 being interposed thereinbetween, so as to form seal between the lid 190 and the can 5.

Figure 17A:
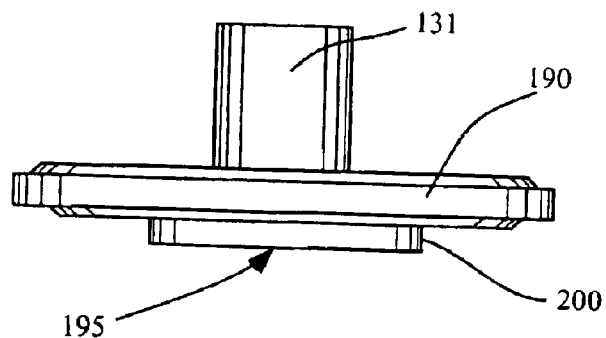
FIGS. 17A through C is a side elevation view, a top planar view and a bottom planar view, respectively, of a lid assembly of the alternative embodiment of FIG. 16.
Figure 17B:
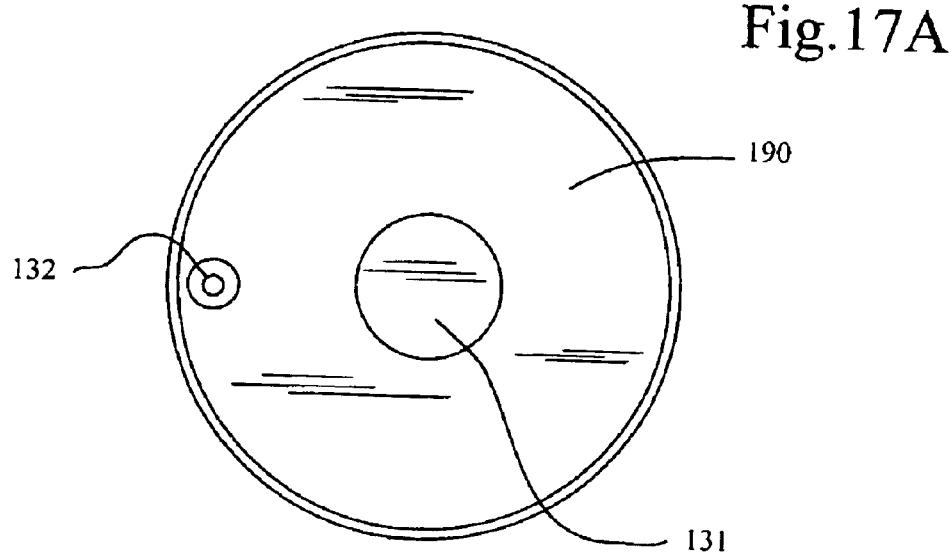
Figure 17C:
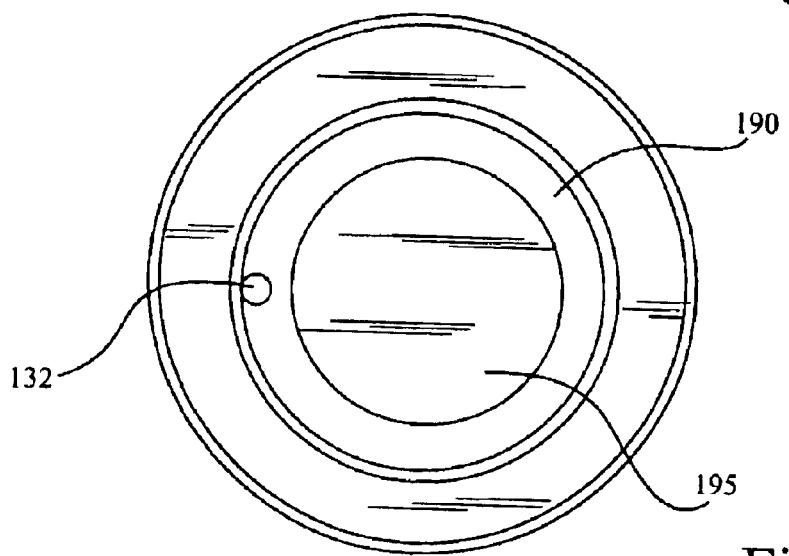

Referring next to FIGS. 17A through 17C, shown is a side elevation view, a top planar view and a bottom planar view, respectively, of the lid 190 of FIG. 16.

The depression 195 and the flange 200 cover the structure 205 on the top collector disk 180 of FIGS. 14A through 14C (as shown in FIG. 16).

Also shown are the terminal post 131 and the hole 132 that serves as a fill port for an electrolyte solution.

The electrolyte solution is introduced into the electrochemical double layer capacitor, and the hole is sealed, in a manner similar to that described above.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for use in a double layer capacitor comprising:

a can;

a terminal post at a basal end of the can formed integral with the can and extending down from the exterior of the basal end of the can; and a plurality of wedge-like bars at an interior basal end of the can wherein the basal end of the can forms a collector.

2. An apparatus for use in a double layer capacitor comprising:

a can;

a terminal post at a basal end of the can formed integral with the can and extending down from the exterior of the basal end of the can; and a taper at a periphery of an interior basal end of the can.

3. An apparatus for use in a double layer capacitor comprising:

a can;

a terminal post at a basal end of the can formed integral with the can and extending down from the exterior of the basal end of the can;

an electrode assembly having electrode contact edges on proximal and distal ends of the electrode assembly, the electrode assembly being positioned inside the can with the distal end being electrically coupled to the can; and a collector disk electrically coupled to the proximal end of the electrode assembly, the collector disk including a structure extending away from the proximal end of the electrode assembly.

4. The apparatus of claim 3 further comprising a plurality of wedge-like bars at an interior basal end of the can wherein the basal end of the can forms a collector.

5. The apparatus of claim 4 further comprising a plurality of channels formed in a bottom basal end of the can for use in laser welding the electrode assembly to the interior basal end of the can.

6. The apparatus of claim 3 further comprising:

an insulating gasket at a perimeter of the collector disk electrically insulating the collector disk from the can.

7. The apparatus of claim 6 further comprising a bead formed around the can at a location on the can above the collector disk such that an interior section of a can wall around the can bends inward to apply pressure to the insulating gasket to secure the collector disk in place and to maintain a pre-load force against the electrode assembly.

8. The apparatus of claim 7 further comprising:

a lid affixed on top of the insulating gasket having a terminal post extending upward from the lid.

9. The apparatus of claim 8 further comprising:

an o-ring gasket placed against the interior of the bead into an open end of the can.

10. The apparatus of claim 8 further comprising:

another insulating gasket around the perimeter of the lid insulating the lid from the interior of the can.

11. The apparatus of claim 8 further comprising:

a hole in said lid positioned over and in contact with the structure of the collector disk.

12. The apparatus of claim 8 further comprising:

a cylindrical depression in said lid positioned over and in contact with the structure of the collector disk.

13. The apparatus of claim 8 further comprising:

a flange on said lid positioned over and in contact with the structure of the collector disk.

14. The apparatus of claim 8 wherein said lid includes a hole through the lid leading into the can, wherein the hole serves as a fill port for an electrolyte solution.

15. The double layer capacitor of claim 14 further comprising:
 a foil seal seated in the hole in the lid at a flange at an interior edge of the hole at a point where the hole widens;
 a bushing between the foil and the interior edge of the hole at the point where the hole widens; and
 a plug with a vent hole therethrough, the plug located on top of the foil, thereby plugging the widened section of the hole.

16. The apparatus of claim 8 wherein a lip of said can is crimped onto a rim of said lid with a second insulating gasket interposed therein between forming a seal between said can and said lid.

17. The apparatus of claim 8 further comprising an electrolyte solution within the electrode assembly and between the lid and the collector disk.

18. The apparatus of claim 6 wherein said insulating gasket comprises polypropylene.

19. The apparatus of claim 3 wherein said collector disk further comprises a plurality of slots through a surface of the collector disk, and wherein the collector disk is affixed to a proximal end of the electrode assembly by laser welding.

20. The double layer capacitor of claim 3 further comprising wedge-like bars on the bottom of the collector disk.

21. An apparatus for use in a double layer capacitor comprising:
 a double layer capacitor electrode assembly having electrode contact edges on a proximal and on a distal end of the double layer capacitor electrode assembly;
 a top collector disk electrically coupled to the electrode contact edges of the proximal end of the double-layer capacitor electrode assembly;
 a lid electrically coupled to the top collector disk; and
 a convex structure; and a flange electrically coupled to the convex structure, the convex structure and the flange being interposed between the lid and the top collector disk, and electrically coupling the lid and the top collector disk to one another.

22. The apparatus of claim 21 wherein said flange is on said lid, wherein said convex structure in on said top collector disk, and wherein said flange is juxtaposed with said convex structure forming an electrical coupling therebetween.

23. An apparatus for use in a double layer capacitor comprising:
 a double layer capacitor electrode assembly having electrode contact edges on a proximal and on a distal end of the double layer capacitor electrode assembly;
 a top collector disk electrically coupled to the electrode contact edges of the proximal end of the double-layer capacitor electrode assembly;
 a lid electrically coupled to the top collector disk; and
 a bottom collector disk electrically coupled to said distal end of the double-layer capacitor electrode assembly;
 wherein said bottom collector disk comprises a plurality of channels.

24. The apparatus of claim 23 wherein said bottom collector disk is welded to said distal end of said double-layer electrode assembly at said distal end.

25. An apparatus for use in a double layer capacitor comprising:
 a double layer capacitor electrode assembly having electrode contact edges on a proximal and on a distal end of the double layer capacitor electrode assembly;
 a top collector disk electrically coupled to the electrode contact edges of the proximal end of the double-layer capacitor electrode assembly;
 a lid electrically coupled to the top collector disk; and
 a gasket against an interior of a bead formed around a top perimeter of an interior of the can, wherein the lid is juxtaposed on top of the o-ring gasket.

26. The apparatus of claim 25 further comprising:
 an insulating gasket around a perimeter of the lid to insulate the lid from the interior of the can.

27. The apparatus of claim 26 further comprising:
 a terminal post extending upward from and integral to the lid.

28. The apparatus of claim 26 wherein a lip of the can is crimped onto a rim of the lid with said insulating gasket on the lid being interposed thereinbetween forming a seal between the lid and the can.

29. The apparatus of claim 26 wherein said lid comprises a hole through the lid.

30. The apparatus of claim 29 further comprising:
 an electrolyte solution within the electrode assembly; and
 a space between the lid and the top collector disk.

31. An apparatus for use in a double layer capacitor comprising:
 a double layer capacitor electrode assembly having electrode contact edges on a proximal and on a distal end of the double layer capacitor electrode assembly;
 a top collector disk electrically coupled to the electrode contact edges of the proximal end of the double-layer capacitor electrode assembly;
 a lid electrically coupled to the top collector disk; and
 a taper in said can at a periphery of an interior basal end of the can.

32. An apparatus for use in a double layer capacitor comprising:
 a double layer capacitor electrode assembly having electrode contact edges on a proximal and on a distal end of the double layer capacitor electrode assembly;
 a top collector disk electrically coupled to the electrode contact edges of the proximal end of the double-layer capacitor electrode assembly;
 a lid electrically coupled to the top collector disk; and
 wherein said electrode contact edges on said distal and proximal ends of the electrode assembly have exposed surfaces and closed gaps between windings at the contact edges.

* * * * *